US011748701B1

(12) United States Patent
Christy et al.

(10) Patent No.: US 11,748,701 B1
(45) Date of Patent: Sep. 5, 2023

(54) MIXED-REALITY ASSISTED EXCEPTION ANALYSIS AND RESOLUTION

(71) Applicant: Blue Yonder Group, Inc., Scottsdale, AZ (US)

(72) Inventors: Brenda Christy, Bangalore (IN); Mayank Tiwari, Hyderabad (IN); Tushar Shekhar, Bengaluru (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 475 days.

(21) Appl. No.: 17/150,051

(22) Filed: Jan. 15, 2021

Related U.S. Application Data

(60) Provisional application No. 62/978,408, filed on Feb. 19, 2020.

(51) Int. Cl.
*G06Q 30/02* (2023.01)
*G06Q 10/087* (2023.01)
*G06T 19/00* (2011.01)
*G06Q 10/0631* (2023.01)

(52) U.S. Cl.
CPC ..... *G06Q 10/087* (2013.01); *G06Q 10/06312* (2013.01); *G06Q 10/06315* (2013.01); *G06T 19/006* (2013.01)

(58) Field of Classification Search
CPC ....................................................... G06Q 30/02
USPC ....................................................... 705/14.1
See application file for complete search history.

(56) References Cited

U.S. PATENT DOCUMENTS

| | | | | |
|---|---|---|---|---|
| 8,606,645 B1* | 12/2013 | Applefeld | ............... | G06Q 30/02 705/26.1 |
| 2004/0257361 A1* | 12/2004 | David Tabakman | ... | G06T 17/00 345/619 |
| 2009/0138375 A1* | 5/2009 | Schwartz | ........... | G06Q 30/0601 705/26.1 |

* cited by examiner

*Primary Examiner* — Afaf Osman Bilal Ahmed
(74) *Attorney, Agent, or Firm* — SPENCER FANE LLP; Steven J. Laureanti

(57) ABSTRACT

A system and method are disclosed to generate mixed-reality visualizations and objects to identify exceptions within large volumes of data and provide resolution options. Embodiments include a computer comprising a processor and memory and a mixed-reality display device comprising a display and one or more sensors. Embodiments generate a first mixed-reality object comprising a first cuboid comprising one or more adjustable display dimensions and one or more cubelets divided along at least one of the one or more adjustable display dimensions. Embodiments display the first mixed-reality object on the display and transform one or more cubelets of the first cuboid in response to a first sensor input. Embodiments identify one or more exceptions, generate one or more resolution options to resolve at least one of the one or more exceptions, and display the transformed one or more cubelets of the first cuboid and the one or more resolution options.

20 Claims, 7 Drawing Sheets

MIXED-REALITY ASSISTED EXCEPTION ANALYSIS AND RESOLUTION

CROSS-REFERENCE TO RELATED APPLICATIONS

The present disclosure is related to that disclosed in the U.S. Provisional Application No. 62/978,408, filed Feb. 19, 2020, entitled "Mixed-Reality Assisted Exception Analysis and Resolution." U.S. Provisional Application No. 62/978,408 is assigned to the assignee of the present application. The subject matter disclosed in U.S. Provisional Application No. 62/978,408 is hereby incorporated by reference into the present disclosure as if fully set forth herein. The present invention hereby claims priority under 35 U.S.C. § 119(e) to U.S. Provisional Application No. 62/978,408.

TECHNICAL FIELD

The present disclosure relates generally to supply chain planning and specifically to mixed-reality-based sensory feedback and graphical representation and manipulation of supply chain monitoring, exception analysis, and resolution options.

BACKGROUND

Existing database systems may display database data using one or more display programs, such as, for example, Microsoft Excel. However, interacting with vast sums of database data using existing interfaces may require significant time investment and the study of hundreds or thousands of individual cells of data to derive meaningful data interpretation or to detect data trends. Data display and visualization systems that (1) require a high degree of training to learn to operate, (2) demand time-consuming granular review in order to accomplish meaningful data analysis, or (3) do not locate data exceptions and propose resolution options, may be undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
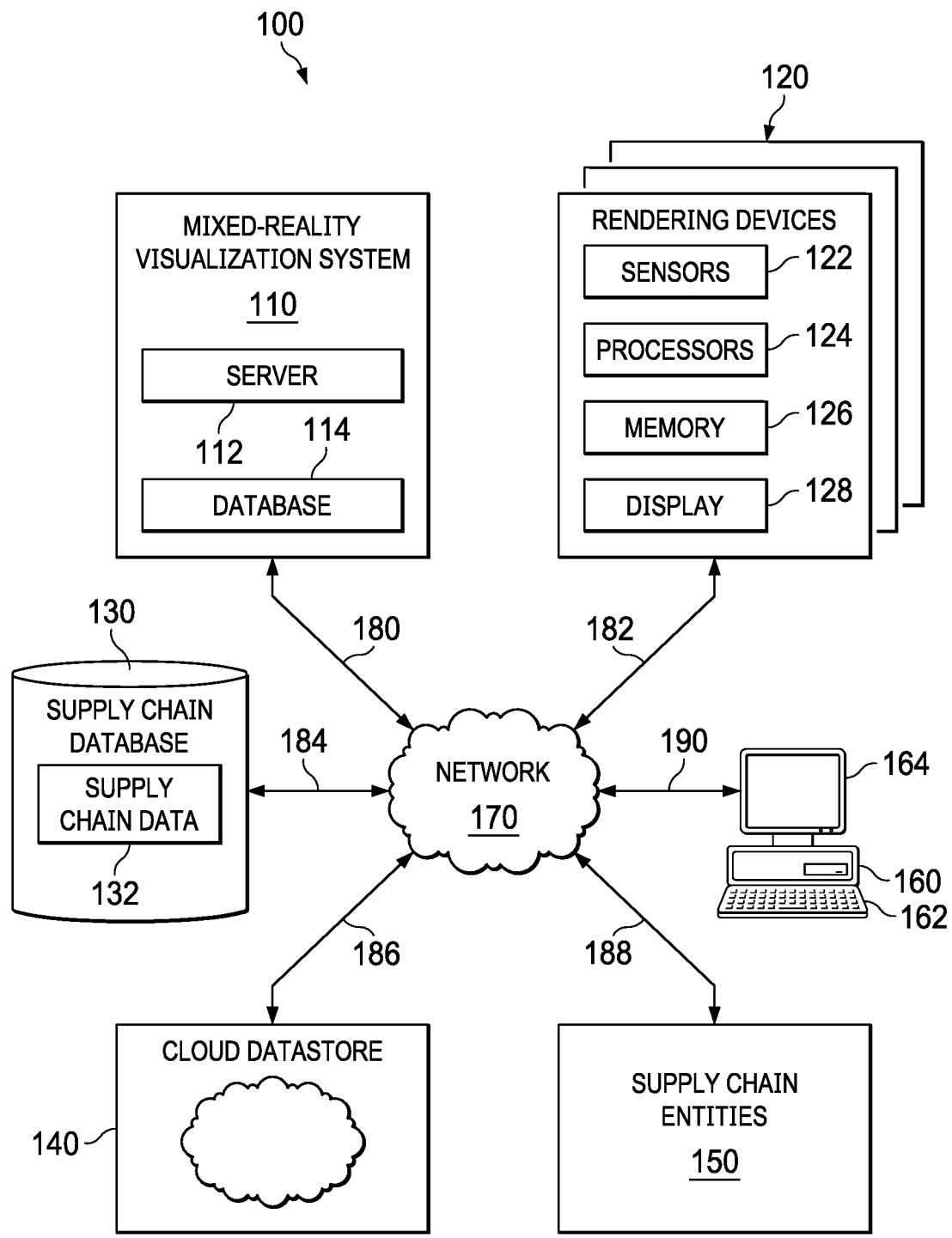
FIG. 1 illustrates an exemplary supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described in greater detail below, embodiments of the following disclosure provide a mixed-reality visualization system and method that generates and manipulates one or more mixed-reality key process indicator (KPI) cuboid visualizations, one or more mixed-reality resolution cuboid visualizations, and/or one or more mixed-reality analysis cuboid visualizations simultaneously. In an embodiment, the mixed-reality KPI cuboid visualization may display database data comprising one or more selectable key process indicators according to one or more selectable dimensions (such as, for example, products sold, facilities at which products are sold, or time periods in which products are sold). In an embodiment, the mixed-reality resolution cuboid visualization may display one or more supply chain exceptions in the form of a rotatable three-dimensional cubical model comprised of smaller exception and non-exception cubelets. Exceptions may comprise, for example, any supply chain event in which a supply chain component does not receive an expected input or generate an expected output, in which a planned quantity of material does not reach its planned destination on time, or in which any other unplanned supply chain event occurs due to a change in supply chain input data or parameters, including but not limited to exterior events such as floods or viral epidemics that restrict one or more supply chain resources. The mixed-reality resolution cuboid visualization, and/or the mixed-reality analysis cuboid visualization, may illustrate one or more resolution options to correct, resolve, or otherwise address the one or more exceptions.

The mixed-reality visualization system and method may include one or more rendering devices that display mixed-reality KPI cuboid visualizations, mixed-reality resolution cuboid visualizations, and/or other mixed-reality visualizations in virtual space, permitting one or more rendering devices, and/or one or more computers, to interact with the mixed-reality KPI cuboid visualizations, to rotate, expand, compress, slice, dice, stack, or otherwise alter the mixed-reality KPI cuboid visualizations and database data visualized by the mixed-reality KPI cuboid visualizations, and to interact with, rotate, and modify the mixed-reality resolution cuboid visualizations and/or other mixed-reality visualizations. In response to the interactions of one or more rendering devices and/or computers with the mixed-reality KPI cuboid visualizations, mixed-reality resolution cuboid visualizations, and/or other mixed-reality visualizations, the mixed-reality visualization system and method may access additional data stored in one or more databases, and may incorporate the additional data, and one or more additional KPIs and/or dimensions associated with the additional data, into the mixed-reality KPI cuboid visualizations, mixed-reality resolution cuboid visualizations, and/or other mixed-reality visualizations. The mixed-reality visualization system and method may analyze exceptions displayed by the mixed-reality resolution cuboid visualizations according to exception severity, and may automatically generate and display one or more resolution options to address the exceptions.

Embodiments of the following disclosure enable one or more rendering devices and/or one or more computers to interact with, manipulate, and call up large volumes of data swiftly and efficiently. Embodiments permit the visualization of data according to selectable KPIs and dimensions, and may represent patterns, trends, or other relationships using color-coded mixed-reality KPI cuboid visualizations, mixed-reality resolution cuboid visualizations, and other mixed-reality visualizations. In an embodiment, the mixed-reality KPI cuboid visualizations and mixed-reality resolution cuboid visualizations may assist in the identification of, and the taking action in response to, supply chain exceptions, supply chain problems, and/or apparent or obscure patterns or trends in database data in a streamlined and efficient fashion. According to embodiments, the mixed-reality visualization system and method may enhance data analysis by simultaneously generating mixed-reality KPI cuboid visualizations, and mixed-reality resolution cuboid visualizations and/or mixed-reality analysis cuboid visualizations, to display and configure data in complementary visual representations, and by automatically generating and displaying resolution options to respond to one or more supply chain exceptions.

FIG. 1 illustrates exemplary supply chain network 100, in accordance with a first embodiment. Supply chain network 100 comprises mixed-reality visualization system 110, one or more rendering devices 120, supply chain database 130, cloud datastore 140, one or more supply chain entities 150, computer 160, network 170, and communication links 180-190. Although single mixed-reality visualization system 110, one or more rendering devices 120, single supply chain database 130, single cloud datastore 140, one or more supply chain entities 150, single computer 160, and single network 170 are shown and described, embodiments contemplate any number of mixed-reality visualization systems 110, any number of rendering devices 120, any number of supply chain entities 150, any number of supply chain databases 130, any number of cloud datastores 140, any number of computers 160, or any number of networks 170, according to particular needs.

Mixed-reality visualization system 110 comprises server 112 and database 114. Server 112 of mixed-reality visualization system 110 comprises one or more modules that generate a mixed-reality environment (comprising virtual objects overlaid upon and anchored to real-world objects), a virtual reality environment (comprising virtual objects and displays oriented in a fully-artificial digital environment), and/or an extended reality environment (comprising a combination of mixed and virtual reality elements). The mixed-reality environment, virtual reality environment, and/or extended reality environment may display interactive three-dimensional visualizations for supply chain management (including but not limited to strategic planning and master planning), physicalization of supply chain planning problems, identifying and solving supply chain problems, viewing key process indicators (KPIs), supply chain exceptions, resolution options, and other supply chain metrics and parameters, and navigation of a global supply chain network 100. Embodiments of the following mixed-reality visualization system 110 interface with one or more rendering devices 120 to process, render, and display the mixed-reality environment and representations of supply chain network 100. According to further embodiments, mixed-reality visualization system 110 and one or more rendering devices 120 generate a visualization of, among other things, supply and demand, distribution networks, supply chain analytics, supply chain alerts, and KPIs, which may be conveyed to the user via one or more rendering devices 120 using visual and/or aural indicators. Mixed-reality visualization system 110 receives and processes data from one or more rendering devices 120, supply chain database 130, cloud datastore 140, and/or one or more supply chain entities 150 and stores the data in database 114.

Figure 2:
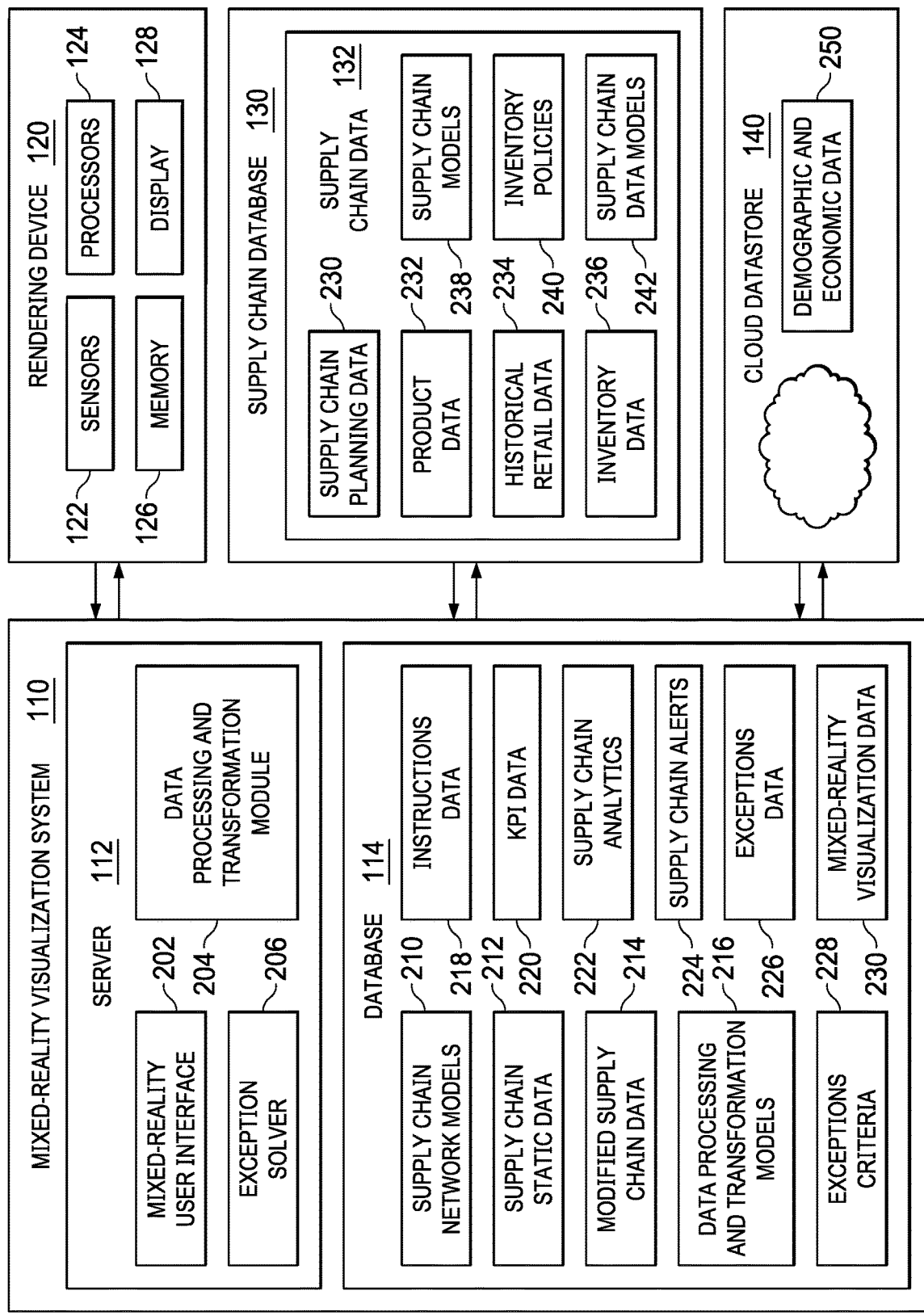
FIG. 2 illustrates the mixed-reality visualization system, rendering device, supply chain database, and cloud datastore of FIG. 1 in greater detail, in accordance with an embodiment.

According to embodiments, one or more rendering devices 120 comprise one or more electronic devices that display mixed-reality visualizations for navigating and interacting with supply chain network 100 and supply chain analytics 222 stored in mixed-reality visualization system 110 database 114 (illustrated by FIG. 2). One or more rendering devices 120 may comprise, for example, a mixed-reality headset, a head-mounted display, a smartphone, a tablet computer, a mobile device, a projector, or like devices. One or more rendering devices 120 comprise one or more sensors 122, one or more processors 124, memory 126, one or more displays 128, and may include an input device, output device, and a fixed or removable computer-readable storage media. One or more sensors 122 may comprise an imaging sensor, such as, for example, a camera module, a light detection and ranging (LIDAR) device, radar device, infrared light sensor, ambient light sensor, or other electronic sensor. According to one embodiment, one or more sensors 122 may detect the head movement, the field of vision, and the gaze of a user of one or more rendering devices 120. One or more processors 124 and associated memory 126 execute instructions and manipulate information according to the operation of mixed-reality visualization system 110 and any of the methods described herein. Display 128 displays visual information, such as, for example, feedback, analysis, data, images or graphics using mixed-reality visualizations. For example, display 128 may superimpose graphics, colors, text, or other renderings of supply chain data 132 over or in connection with a virtual visualization of a cuboid comprised of cubelets. Using one or more rendering devices 120, a user may interact with the rendered visualizations using speech, eye movement, and/or spoken instructions to interact with and modify supply chain network 100. Mixed-reality visualization system 110, in connection with one or more rendering devices 120, comprises a system to visualize supply chain processes and supply chain analytics 222 for improved real-time interaction. One or more rendering devices 120 may include fixed or removable computer-readable storage media, including a non-transitory computer readable medium, magnetic computer disks, flash drives, CD-ROM, in-memory devices or other suitable media to receive output from and provide input to mixed-reality visualization system 110.

Supply chain database 130 stores supply chain data 132 received from one or more supply chain entities 150. In one embodiment supply chain database 130 stores supply chain data 132 received from a manufacturing supply chain, such as, for example, data received from a demand planning system, inventory optimization system, supply planning system, order promising system, factory planning and sequencing system, and sales and operations planning system. In an embodiment in which supply chain network 100 comprises a retail supply chain, supply chain database 130 stores supply chain data 132 received from one or more retail supply chain planning and execution systems such as, for example, historical sales data, retail transaction data, store characteristic data, and data received from a demand planning system, assortment optimization system, category management system, transportation management system, labor management system, and/or warehouse management system. Although particular planning and execution systems of particular types of supply chain networks 100 are shown and described, embodiments contemplate supply chain database 130 storing data received from planning and execution systems for any type of supply chain network 100 and data received from one or more locations local to, or remote from, supply chain network 100, such as, for example, social media data, weather data, social trends, and the like.

Figure 5:
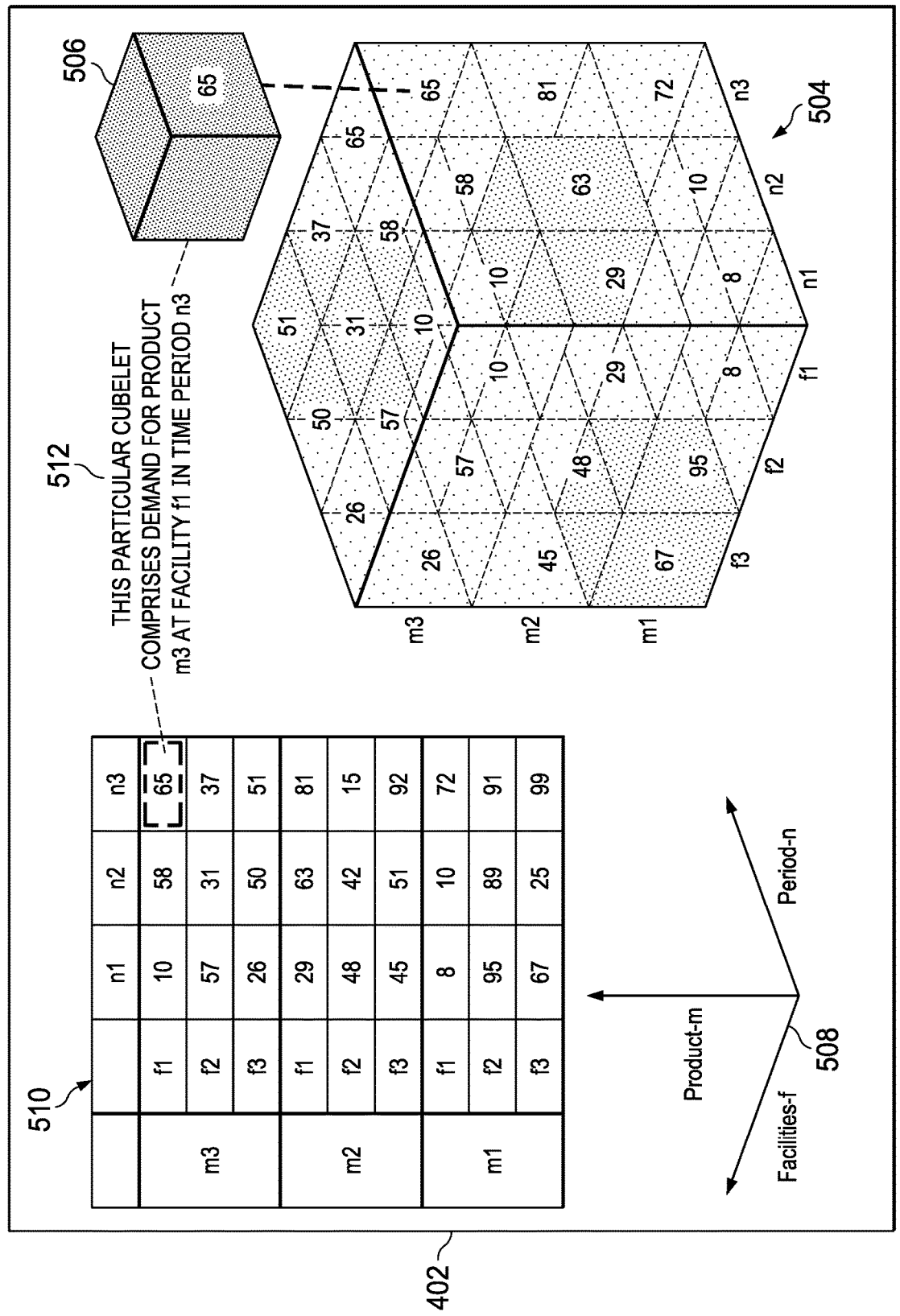
FIG. 5 illustrates the mixed-reality KPI cuboid visualization display of FIG. 4 in greater detail, according to an embodiment.
Figure 6:
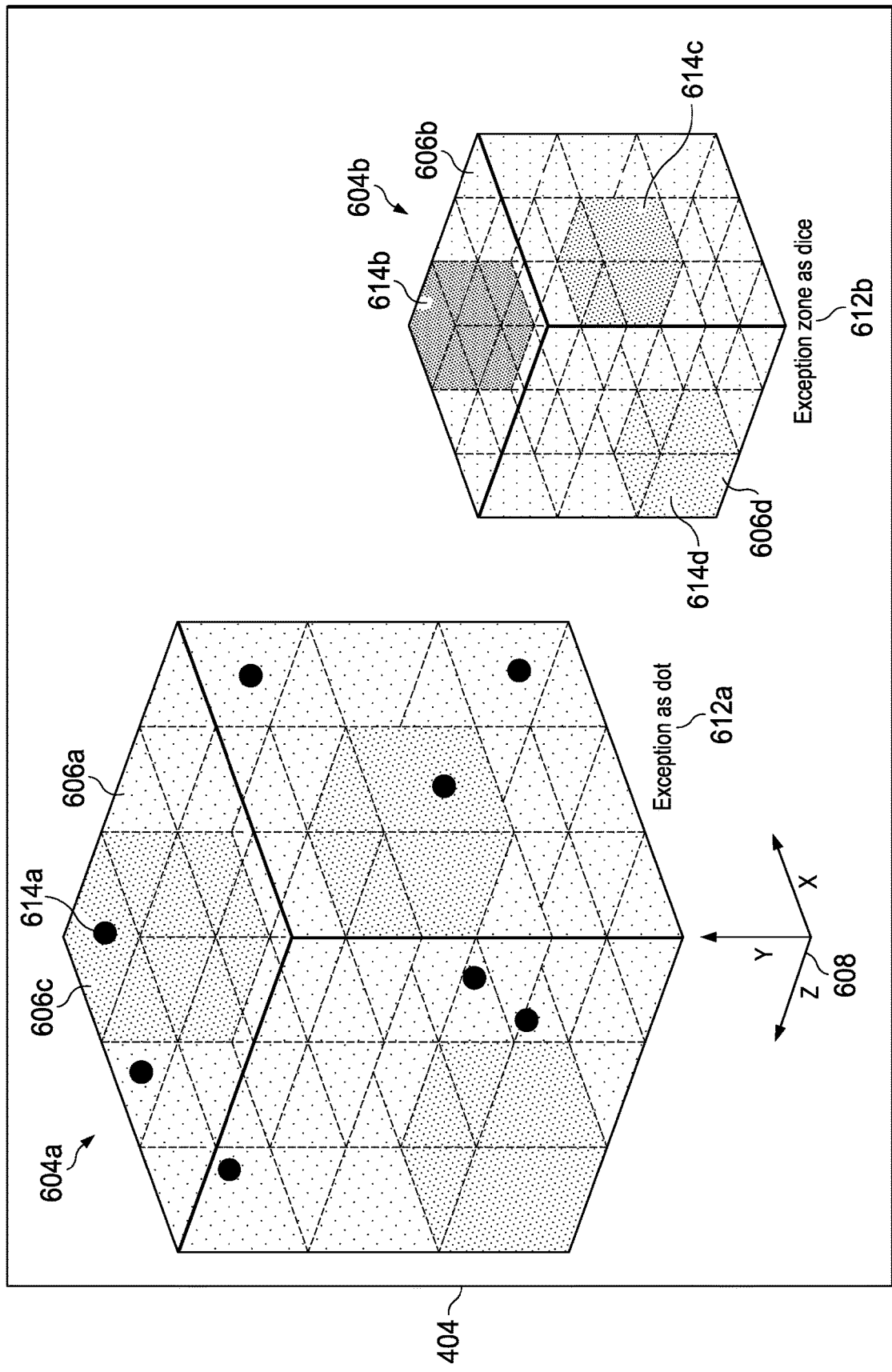
FIG. 6 illustrates the mixed-reality resolution cuboid visualization display of FIG. 4 in greater detail, according to an embodiment.
Figure 7:
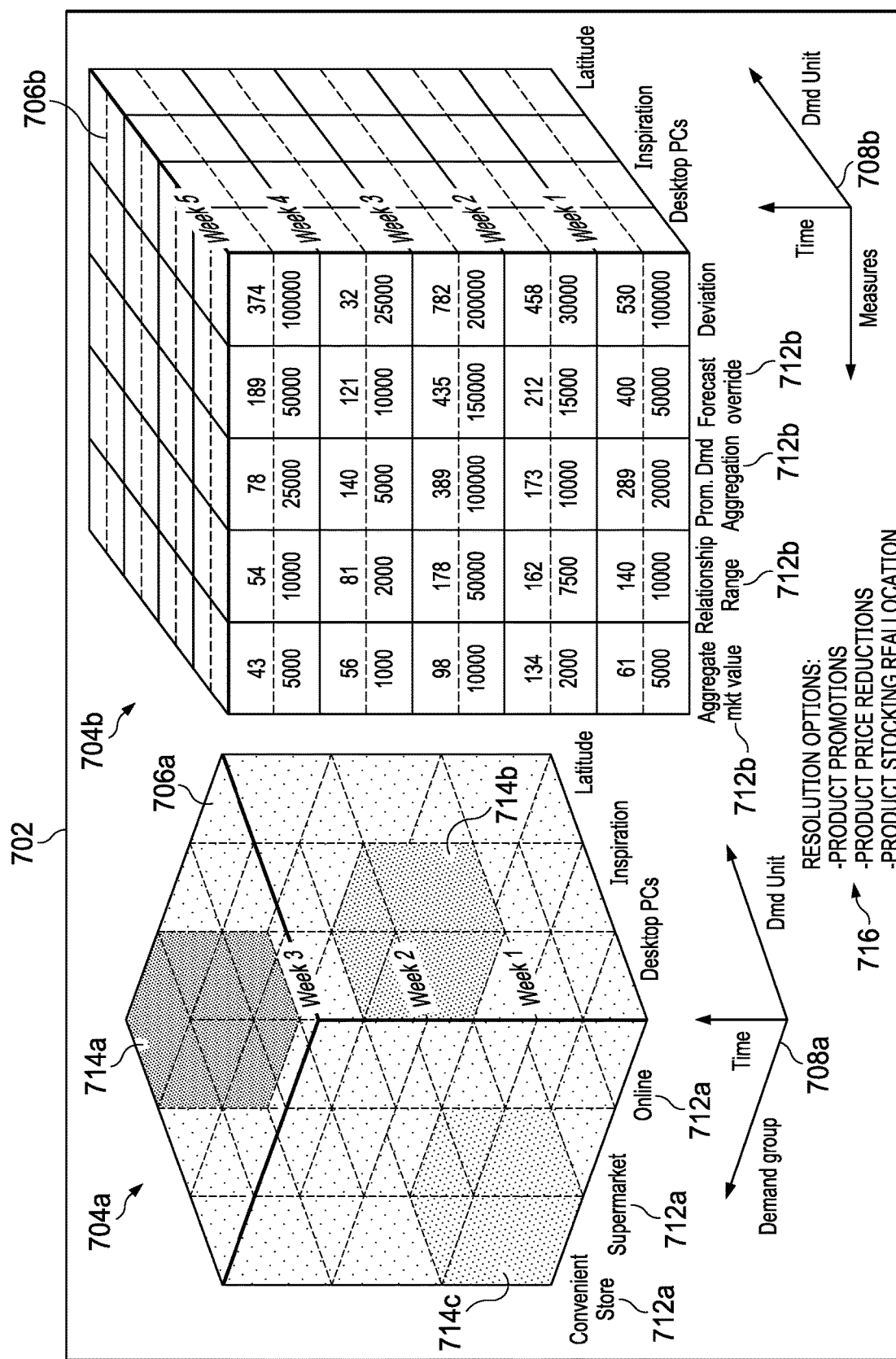
FIG. 7 illustrates a mixed-reality analysis cuboid visualization display, according to an embodiment.

Cloud datastore 140 receives and stores demographic and economic data, which may be accessed by mixed-reality visualization system 110 and mapped to one or more mixed-reality KPI cuboid visualizations, best illustrated by FIG. 5, one or more mixed-reality resolution cuboid visualizations, best illustrated by FIG. 6, and/or one or more mixed-reality analysis cuboid visualizations, best illustrated by FIG. 7. Although cloud datastore 140 is illustrated and described as comprising demographic and economic data, embodiments contemplate cloud datastore 140 storing any type of data received from any one or more locations local to, or remote from, supply chain network 100.

Mixed-reality visualization system 110, one or more rendering devices 120, supply chain database 130, cloud datastore 140, and one or more supply chain entities 150 may operate on one or more computers 160 that are integral to or separate from the hardware and/or software that support that mixed-reality visualization system 110, one or more rendering devices 120, supply chain database 130, cloud datastore 140, and one or more supply chain entities 150. Each of one or more computers 160 may be a work station, personal computer (PC), network computer, notebook computer, tablet, personal digital assistant (PDA), cell phone, telephone, wireless data port, mobile device, or any other suitable computing device. In an embodiment, one or more users may be associated with mixed-reality visualization system 110. Computers 160 may include any suitable input device 162, such as a keypad, mouse, touch screen, joystick, navigation control device, microphone, or other device to input information to mixed-reality visualization system 110, one or more rendering devices 120, supply chain database 130, cloud datastore 140, one or more supply chain entities 150, and computer 160. Computers 160 may include output device 164, which may convey information associated with the operation of mixed-reality visualization system 110, including digital or analog data, visual information, or audio information such as, for example, one or more displays, monitors, speakers, headsets, and/or haptics. Computers 160 may include fixed or removable computer-readable storage media, including a non-transitory computer readable medium, magnetic computer disks, flash drives, CD-ROM, in-memory devices or other suitable media to receive output from and provide input to mixed-reality visualization system 110. Computers 160 may include one or more processors 124 and associated memory 126 to execute instructions and manipulate information according to the operation of mixed-reality visualization system 110 and any of the methods described herein. In addition, or as an alternative, embodiments contemplate executing the instructions on computers 160 that cause computers 160 to perform functions of the method. Further examples may also include articles of manufacture including tangible computer-readable media that have computer-readable instructions encoded thereon, and the instructions may comprise instructions to perform functions of the methods described herein.

Although single computer 160 is illustrated in FIG. 1, mixed-reality visualization system 110, one or more rendering devices 120, supply chain database 130, cloud datastore 140, and one or more supply chain entities 150 may each operate on separate computers 160 or may operate on one or more shared computers 160. One or more users associated with mixed-reality visualization system 110 and/or one or more rendering devices 120 may include, for example, a "manager" or a "planner" handling inventory planning, packing, and/or shipping for items of one or more supply chain entities 150 based, at least in part, on altered parameters received from mixed-reality visualization system 110 in response to a user input and/or one or more related tasks within supply chain network 100. In addition, or as an alternative, these one or more users within supply chain network 100 may include, for example, one or more computers 160 programmed to autonomously handle, among other things, one or more supply chain processes such as demand planning, supply and distribution planning, inventory management, allocation planning, and/or order fulfillment.

In one embodiment, one or more supply chain entities 150 represent one or more supply chain networks, including, for example, one or more enterprises, and may comprise one or more suppliers, manufacturers, distribution centers, retailers, and/or customers. A supplier may be any suitable entity that offers to sell or otherwise provides one or more items (i.e., materials, components, or products) to one or more manufacturers. Items may comprise, for example, parts or supplies used to generate products. An item may comprise a part of the product, or an item may comprise a supply that is used to manufacture the product, but does not become a part of the product, for example, a tool, energy, or resource. According to some embodiments, items comprise foods or ingredients. According to other embodiments, items and products may each receive a Universal Product Code (UPC), RFID tag, or barcode that identifies (including uniquely identifying) the item or product. Such suppliers may comprise automated distribution systems that automatically transport products to one or more manufacturers based, at least in part, on one or more altered parameters received from mixed-reality visualization system 110 in response to a user input, such as, for example an instruction to increase capacity at one or more supply chain locations, altering demand or supply levels at one or more supply chain entities 150, or other interactions described herein.

A manufacturer may be any suitable entity that manufactures at least one product. A manufacturer may use one or more items during the manufacturing process to produce any manufactured, fabricated, assembled, or otherwise processed item, material, component, good or product. In one embodiment, a product represents an item ready to be supplied to, for example, another supply chain entity 150, such as a supplier, an item that needs further processing, or any other item. A manufacturer may, for example, produce and sell a product to a supplier, another manufacturer, a distribution center, retailer, a customer, or any other suitable entity. Such manufacturers may comprise automated robotic production machinery that produce products based, at least in part, on one or more altered parameters received from mixed-reality visualization system 110 in response to a user input, such as, for example an instruction to increase capacity at one or more supply chain locations, altering demand or supply levels at one or more supply chain entities 150, or other interactions described herein.

A distribution center may be any suitable entity that offers to store or otherwise distributes at least one product to one or more retailers and/or customers. A distribution center may, for example, receive a product from another entity in supply chain network 100 and store and transport the product for another supply chain entity 150. Such distribution centers may comprise automated warehousing systems that automatically remove products from and place products into inventory based, at least in part, on one or more altered parameters received from mixed-reality visualization system 110 in response to a user input, such as, for example an instruction to increase capacity at one or more supply chain locations, altering demand or supply levels at one or more supply chain entities 150, or other interactions described herein.

One or more retailers may be any suitable entity that obtains one or more products to sell to one or more customers. In addition, one or more retailers may sell, store, and supply one or more components and/or repair a product with one or more components. One or more retailers may comprise any online or brick and mortar location, including locations with shelving systems. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers based on computer-generated instructions or automatically by machinery to place products in a desired location.

Although one or more supply chain entities 150 are shown and described as separate and distinct entities, the same entity may simultaneously act as any other of one or more supply chain entities 150. For example, one or more supply chain entities 150 acting as a manufacturer may produce a product, and the same entity may then act as a supplier to supply an item to itself or another supply chain entity 150. Although one example of supply chain network 100 is shown and described, embodiments contemplate any suitable supply chain network 100, according to particular needs.

In one embodiment, mixed-reality visualization system 110, one or more rendering devices 120, supply chain database 130, cloud datastore 140, one or more supply chain entities 150, and one or more computers 160 are coupled with network 170 using communication links 180-190, each of which may be any wireline, wireless, or other link suitable to support data communications between mixed-reality visualization system 110, one or more rendering devices 120, supply chain database 130, cloud datastore 140, one or more supply chain entities 150, and one or more computers 160 and network 170 during operation of supply chain network 100. Although communication links 180-190 are shown as generally coupling mixed-reality visualization system 110, one or more rendering devices 120, supply chain database 130, cloud datastore 140, one or more supply chain entities 150, and computer 160 with network 170, mixed-reality visualization system 110, one or more rendering devices 120, one or more supply chain databases 130, one or more cloud datastores 140, one or more supply chain entities 150, and computers 160 may communicate directly with mixed-reality visualization system 110, one or more rendering devices 120, supply chain database 130, cloud datastore 140, one or more supply chain entities 150, and computer 160, according to particular needs.

In other embodiments, network 170 includes the Internet and any appropriate local area networks (LANs), metropolitan area networks (MANs), or wide area networks (WANs) coupling mixed-reality visualization system 110, one or more rendering devices 120, supply chain database 130, cloud datastore 140, one or more supply chain entities 150, and computers 160. For example, data may be maintained by mixed-reality visualization system 110 at one or more locations external to mixed-reality visualization system 110, one or more rendering devices 120, supply chain database 130, cloud datastore 140, one or more supply chain entities 150, and computers 160 and made available to one or more associated users of mixed-reality visualization system 110, one or more rendering devices 120, supply chain database 130, cloud datastore 140, one or more supply chain entities 150, and computers 160 using network 170 or in any other appropriate manner. Those skilled in the art will recognize that the complete structure and operation of network 170 and other components within supply chain network 100 are not depicted or described. Embodiments may be employed in conjunction with known communications networks and other components.

In accordance with the principles of embodiments described herein, mixed-reality visualization system 110 may generate an inventory plan, packing plan, or shipping plan for the items of one or more supply chain entities 150 in supply chain network 100 based, at least in part, on altered parameters received from mixed-reality visualization system 110 in response to a user input, such as, for example an instruction to increase capacity at one or more supply chain locations, altering demand or supply levels at one or more supply chain entities 150, siting a warehouse or distribution center for a potential demand region, or other interactions described herein. Furthermore, mixed-reality visualization system 110 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of items based on one or more generated inventory plans, packing plans, or shipping plans and/or current inventory or production levels. For example, the methods described herein may include computers 160 receiving product data from automated machinery having at least one sensor and product data corresponding to an item detected by the automated machinery. The received product data may include an image of the item, an identifier, as described above, and/or other product data associated with the item (dimensions, texture, estimated weight, and any other like data). The method may further include computers 160 looking up received product data in a database system associated with mixed-reality visualization system 110 to identify the item corresponding to product data received from the automated machinery.

Computers 160 may also receive, from the automated machinery, a current location of the identified item. Based on the identification of the item, computers 160 may also identify (or alternatively generate) a first mapping in a database system, where the first mapping is associated with the current location of the identified item. Computers 160 may also identify a second mapping in the database system, where the second mapping is associated with a past location of the identified item. Computers 160 may also compare the first mapping and the second mapping to determine if the current location of the identified item in the first mapping is different than the past location of the identified item in the second mapping. Computers 160 may then send instructions to one or more rendering devices 120 or automated machinery based, as least in part, on one or more differences between the first mapping and the second mapping such as, for example, to locate items to add to or remove from an inventory, container, or package for one or more supply chain entities 150.

According to these embodiments, mixed-reality visualization system 110 may determine a difference between current inventory levels and the inventory reorder points for one or more items in an inventory. Based on the difference, mixed-reality visualization system 110 may instruct the automated machinery to add items to a shipment in an amount equal to the inventory target quantities minus the difference between current inventory levels and the inventory reorder points. For example, mixed-reality visualization system 110 may determine an inventory plan, packing plan, or shipping plan based on forecasted demand, current inventory levels, forecasted production levels, item attributes, pack constraints, store constraints, and the like. Based on these factors and constraints, mixed-reality visualization system 110 generates instructions, feedback, and a visualization of supply chain network 100 via one or more rendering devices 120.

FIG. 2 illustrates mixed-reality visualization system 110, rendering device 120, supply chain database 130, and cloud datastore 140 of FIG. 1 in greater detail, in accordance with an embodiment. As described above, mixed-reality visualization system 110 comprises server 112 and database 114. Although mixed-reality visualization system 110 is illustrated and described as comprising single server 112 and single database 114, embodiments contemplate any number of servers 112 or databases 114 internal to, or externally coupled with, mixed-reality visualization system 110, according to particular needs.

Database 114 of mixed-reality visualization system 110 comprises supply chain network models 210, supply chain static data 212, modified supply chain data 214, data processing and transformation models 216, instructions data 218, KPI data 220, supply chain analytics 222, supply chain alerts 224, exceptions data 226, exceptions criteria 228, and mixed-reality visualization data 230. Although database 114 is shown and described as comprising supply chain network models 210, supply chain static data 212, modified supply chain data 214, data processing and transformation models 216, instructions data 218, KPI data 220, supply chain analytics 222, supply chain alerts 224, exceptions data 226, exceptions criteria 228, and mixed-reality visualization data 230, embodiments contemplate any number or combination of data stored at one or more locations local to, or remote from, mixed-reality visualization system 110, such as on multiple servers 112 or computers 160 at any location in supply chain network 100.

According to embodiments, mixed-reality visualization system 110 uses one or more supply chain network models 210 to display supply chain static data 212, modified supply chain data 214, and/or supply chain database 130 data and/or cloud datastore 140 data by simultaneous mixed-reality KPI cuboid visualization and mixed-reality resolution cuboid visualization, described in greater detail below. In addition, mixed-reality visualization system 110 utilizes one or more supply chain network models 210 to process modified supply chain data 214 generated by one or more rendering devices 120 in response to and based, at least in part, on one or more user interactions with mixed-reality user interface 202 such as, for example, physical, visual, and voice inputs and feedback, which may be stored as instructions data 218. According to embodiments, supply chain network models 210 may store and/or comprise any data related to one or more mixed-reality KPI cuboid visualizations and/or one or more mixed-reality resolution cuboid visualizations, including but not limited to one or more selected data tables, KPIs, dimensions, and color schemes.

In addition, mixed-reality visualization system 110 uses one or more data processing and transformation models 216 (which may include, for example, one or more heuristic models) to generate KPIs (which may be stored as KPI data 220) for mapping to a mixed-reality KPI cuboid visualization and/or a mixed-reality supply chain visualization, and to receive input and other instructions generated by one or more rendering devices 120, such as for example, one or more user interactions with mixed-reality user interface 202 such as, for example, physical, visual, and voice inputs and feedback, which may be stored as instructions data 218.

KPI data 220 may comprise the aggregated values of input or output fields for records in different tables. KPIs may also comprise the optimal values of one or more variables as received in response to formulating the constraints and objectives or solving a mixed-integer linear programming problem.

Supply chain analytics 222 comprise input data, output data, and/or values of various objectives which may be displayed at a detailed level or aggregated over one or more dimensions. Embodiments of mixed-reality visualization system 110 contemplate supply chain analytics 222 comprising answers displayed by mixed-reality visualization system 110 in response to simple or complex queries. By way of example only and not by limitation, mixed-reality visualization system 110 may receive a query spoken by a user, such as, for example, "Show me a three-dimensional representation of products sold at Facility 1 from October-December 2019." In response to the received query, mixed-reality visualization system 110 may generate or alter a mixed-reality KPI cuboid visualization to display a cuboid representing products sold at Facility 1 from October-December 2019. Mixed-reality visualization system 110 and method may also generate or alter a mixed-reality resolution cuboid visualization displaying any supply chain exceptions associated with products sold at Facility 1 from October-December 2019.

According to embodiments, mixed-reality visualization system 110 provides for monitoring one or more supply chain processes, detecting an exception or problem condition (such as, for example, a KPI that is outside of a predetermined threshold), and generating one or more supply chain alerts 224. Supply chain alerts 224 may comprise changing the color, size, or other properties of mapped features (such as, for example, one or more nodes of supply chain network 100) as well as any type of visual, auditory, or haptic cues.

Exceptions data 226 may comprise one or more exceptions, generated by exception solver 206. Exceptions criteria 228 may comprise one or more ranking criteria by which exception solver 206 may rank exceptions stored in exceptions data 226 by severity, degree of supply chain disruption, or by any other factor. Mixed-reality visualization data 230 may store one or more mixed-reality KPI cuboid visualizations and/or one or more mixed-reality resolution cuboid visualizations generated by mixed-reality user interface 202.

Server 112 of mixed-reality visualization system 110 comprises mixed-reality user interface 202, data processing and transformation module 204, and exception solver 206. Although server 112 is shown and described as comprising single mixed-reality user interface 202, single data processing and transformation module 204, and single exception solver 206, embodiments contemplate any suitable number or combination of mixed-reality user interfaces 202, data processing and transformation modules 204, and exception solvers 206 located at one or more locations, local to, or remote from mixed-reality visualization system 110, such as on multiple servers 112 or computers 160 at any location in supply chain network 100.

Mixed-reality user interface 202 generates and modifies (1) a mixed-reality KPI cuboid visualization comprising a manipulable multi-dimensional cuboid, comprised of individual cubelets representing selectable aspects of supply chain data 132 (such as, for example, a particular product-location-time period combination that comprises the number of products sold at a particular location on a particular day), that displays one or more parameters of supply chain network 100; and (2) a mixed-reality resolution cuboid visualization comprising a rotatable three-dimensional cubical model comprised of smaller exception and non-exception cubelets. Mixed-reality user interface 202 may provide for the navigation (such as, for example, zooming in and out, rotation, internal or external viewing, and the like) and manipulation (such as, for example, expanding, compressing, aggregating, slicing, and dicing) of the mixed-reality KPI cuboid visualization, and the navigation and manipulation of the mixed-reality resolution cuboid visualization, by receiving physical, visual, and voice input from one or more rendering devices 120. In addition, mixed-reality user interface 202 generates interactive displayed data in the form of mixed-reality KPI cuboid visualizations and mixed-reality resolution cuboid visualizations (which may include, in an embodiment, nodes of supply chain network 100, supply chain metrics and parameters, and the like) by receiving input from one or more rendering devices 120.

Mixed-reality user interface 202 may model one or more supply chain planning problems (such as, for example, an inventory planning problem, a master planning problem, a demand and supply planning problem, and the like), identify resources, operations, buffers, and pathways, and map supply chain network 100 using supply chain network models 210 and/or supply chain data models 242.

According to embodiments, data processing and transformation module 204 modifies supply chain data 132 in response to receiving input or instructions from one or more rendering devices 120. According to one embodiment, data processing and transformation module 204 generates a solution to the supply chain planning problem mapped to the mixed-reality KPI cuboid visualization and/or mixed-reality resolution cuboid visualization based, at least in part, on input and instructions received from one or more rendering devices 120. As described below, mixed-reality visualization system 110 selects KPIs and other data outputs for display on a mixed-reality KPI cuboid visualization using one or more data processing and transformation modules 204.

In an embodiment, exception solver 206 may access mixed-reality visualization system 110 database 114, supply chain database 130, cloud datastore 140, and exceptions criteria 228. Exception solver 206 may evaluate one or more supply chain models 238, supply chain network models 210, supply chain planning problems, supply chain planning data 230, and/or one or more mixed-reality KPI cuboid visualizations generated by mixed-reality user interface 202 to detect supply chain exceptions according to one or more exceptions criteria 228. Having located one or more supply chain exceptions, exception solver 206 may store the located supply chain exceptions in exceptions data 226.

As an example only and not by way of limitation, in an embodiment, one such exceptions criteria 228 may comprise a supply chain model criteria that specifies all supply chain manufacturers must manufacture and ship all products to downstream retailers by Jan. 31, 2020. Exception solver 206 may access this exceptions criteria 228 and may locate a particular supply chain manufacturer that will not be able to manufacture and ship all products by Jan. 31, 2020. Exception solver 206 may store this discrepancy as a supply chain exception in exceptions data 226.

In an embodiment, exception solver 206 may rank the exceptions stored in exceptions data 226 by severity of exception as measured by exceptions criteria 228. For example, in an embodiment, exceptions criteria 228 may specify that a particular exception that disrupts production at all supply chain manufacturers in supply chain network 100 is more severe, and thus comprises a higher rank, than an exception that disrupts production only at a single supply chain manufacturer in supply chain network 100. Exception solver 206 may assign severity rankings to the exceptions stored in exceptions data 226 based on any number of exceptions criteria 228. Exception solver 206 may also automatically generate one or more resolution options to address the one or more exceptions. By way of example only and not by way of limitation, in an embodiment in which a particular exception indicates a supply chain manufacturer will receive insufficient input material to complete a manufacturing order, exception solver 206 may generate an alternative supply chain plan that alters input variables so that the supply chain manufacturer does receive sufficient input material to complete the manufacturing order. Having generated the alternative supply chain plan resolution option, exception solver 206 stores the resolution option in exceptions data 226.

One or more rendering devices 120 comprises sensors 122, processors 124, memory 126, and display 128, as described above. According to one embodiment, one or more rendering devices 120 comprise sensors 122 comprising a gaze tracking sensor, hand gesture sensor, and head orientation sensor. According to other embodiments, one or more rendering devices 120 provides a spatial visualization of a mixed-reality KPI cuboid visualization and a mixed-reality resolution cuboid visualization providing for viewing, hearing, and/or receiving haptics conveying supply chain data 132, KPI data 220, supply chain analytics 222, feedback, and other data through a device such as a mixed-reality headset (for example, the MICROSOFT HOLOLENS, META 2 or EPSON MOVERIO BT-200 mixed-reality headsets). According to embodiments, one or more rendering devices 120 may receive one or more user inputs for search, navigation, visualization, and supply chain action. Embodiments contemplate a mixed-reality headset that provides user input by one or more of voice tracking, gaze tracking, hand gesture tracking, and incremental discovery (i.e. looking in a direction to discover the related supply chain components). Additionally, one or more sensors 122 of one or more rendering devices 120 may be located at one or more locations local to, or remote from, one or more rendering devices 120, including, for example, one or more sensors 122 integrated into one or more rendering devices 120 or one or more sensors 122 remotely located from, but communicatively coupled with, one or more rendering devices 120. As described above, one or more rendering devices 120 may include one or more processors 124 and associated memory 126 to execute instructions and manipulate information according to the operation of mixed-reality visualization system 110 and any of the methods described herein.

For example, a user may navigate mixed-reality user interface 202 by speaking a command (such as, for example, "show me the location with the highest shortage" or other like command), by gazing or staring at a particular supply chain network 100 component (such as, for example, staring at a location causes mixed-reality visualization system 110 to alter the color of a visual element to illustrate the amount of demand satisfaction at a node at, or near to, the location), and/or by tracking movements of a hand, finger, or arm of a user (such as, for example, tapping on a mixed-reality surface displayed by one or more rendering devices 120 such as, for example, a graphic representing an end item, causes mixed-reality visualization system 110 to render and/or display a graphic representing the raw-material that is consumed by production of the end item).

Display 128 of one or more rendering devices 120 may comprise for example, a projector, a monitor, an LCD panel, or any other suitable electronic display device. Embodiments contemplate one or more rendering devices 120 having more than one display 128, including but not limited to a first display configured to direct an image into a user's left eye (a left eye display) and a second display configured to direct an image into a user's right eye (a right eye display) to provide a mixed-reality visualization by, for example, displaying visual elements on a transparent or translucent medium directly in front of a user's eyes, so that the visual element appears within the visual field of the user. One or more rendering devices 120 display visual elements overlaid on real-world scenes and located based, at least in part, on the calculated visual field of the user. According to embodiments, information may be projected, overlaid, superimposed, or displayed such that the rendered and displayed images, text, and graphics are fixed in a virtual three-dimensional space anchored with a point or object in the environment, in a virtual space, or an orientation of the user or of one or more rendering devices 120. In addition, or as an alternative, display 128 may display a mixed-reality visualization on an opaque display by overlaying one or more visual elements over a visual feed from a camera, and altering the appearance and placement of the visual elements based, at least in part, on the movement of objects within the visual feed of the camera and/or one or more sensors 122. According to some embodiments, mixed-reality visualization system 110 arranges visual indicators representing one or more supply chain entities 150 on the inner or outer surface of a mixed-reality KPI cuboid visualization and/or a mixed-reality resolution cuboid visualization, based, at least in part, on the field of view of display 128 of one or more rendering devices 120.

As described above, mixed-reality visualization system 110 communicates with one or more external database storage systems such as, for example, supply chain database 130, cloud datastore 140, or one or more other data storage systems local to, or remote from, supply chain network 100.

Supply chain database 130 may comprise one or more databases 114 or other data storage arrangement at one or more locations, local to, or remote from, supply chain network 100. Supply chain database 130 comprises supply chain data 132 including, by way of example only and not of limitation, supply chain planning data 230, product data 232, historical retail data 234, inventory data 236, supply chain models 238, inventory policies 240, and supply chain data models 242. Although supply chain database 130 is shown and described as comprising supply chain planning data 230, product data 232, historical retail data 234, inventory data 236, supply chain models 238, inventory policies 240, and supply chain data models 242, embodiments contemplate any suitable number or combination of these, located at one or more locations, local to, or remote from, supply chain database 130, according to particular needs.

As an example only and not by way of limitation, supply chain database 130 stores supply chain planning data 230, including one or more supply chain planning problems of supply chain network 100 that may be used by mixed-reality visualization system 110. Supply chain planning data 230 may comprise for example, various decision variables, business constraints, goals, and objectives of one or more supply chain entities 150. According to some embodiments, supply chain planning data 230 may comprise hierarchical objectives specified by, for example, business rules, master planning requirements, scheduling constraints, and discrete constraints, including, for example, sequence dependent setup times, lot-sizing, storage, shelf life, and the like.

Product data 232 of supply chain database 130 may comprise one or more data structures for identifying, classifying, and storing data associated with products, including, for example, a product identifier (such as a Stock Keeping Unit (SKU), Universal Product Code (UPC), or the like), product attributes and attribute values, sourcing information, and the like. Product data 232 may comprise data about one or more products organized and sortable by, for example, product attributes, attribute values, product identification, sales quantity, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, fill level, color, and the like).

Historical retail data 234 of supply chain database 130 may comprise, for example, any data relating to past sales, past demand, purchase data, promotions, events, or the like of one or more supply chain entities 150. Historical retail data 234 may cover a time interval such as, for example, by the minute, hourly, daily, weekly, monthly, quarterly, yearly, or any suitable time interval, including substantially in real time. According to embodiments, historical retail data 234 may include historical demand and sales data or projected demand forecasts for one or more retail locations, customers, regions, or the like of one or more supply chain entities 150 and may include historical or forecast demand and sales segmented according to product attributes, customers, regions, or the like.

Inventory data 236 of supply chain database 130 may comprise any data relating to current or projected inventory quantities or states, order rules, or the like. For example, inventory data 236 may comprise the current level of inventory for each item at one or more stocking locations across supply chain network 100. In addition, inventory data 236 may comprise order rules that describe one or more rules or limits on setting an inventory policy, including, but not limited to, a minimum order quantity, a maximum order quantity, a discount, a step-size order quantity, and batch quantity rules. According to some embodiments, mixed-reality visualization system 110 accesses and stores inventory data 236 in supply chain database 130, which may be used by one or more planning and execution systems of one or more supply chain entities 150 to place orders, set inventory levels at one or more stocking points, initiate manufacturing of one or more items (or components of one or more items), or the like. In addition, or as an alternative, inventory data 236 may be updated by receiving current item quantities, mappings, or locations from an inventory system, a transportation network, one or more rendering devices 120, and/or one or more supply chain entities 150.

Supply chain models 238 of supply chain database 130 may comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 238 may also comprise characteristics that specify the structure of supply chain network 100 in even more detail, including, for example, specifying the type of collaboration with the customer (e.g. Vendor-Managed Inventory (VMI)), from which stocking locations or suppliers items may be sourced, customer priorities, demand priorities, how products may be allocated, shipped, or paid for, by particular customers, and the destination stocking locations or one or more supply chain entities 150 where items may be transported. Each of these characteristics may lead to a different supply chain model of supply chain models 238.

Inventory policies 240 of supply chain database 130 may comprise any suitable inventory policy describing the reorder point and target quantity, or other inventory policy parameters that set rules for one or more planning and execution systems of one or more supply chain entities 150 to manage and reorder inventory. Inventory policies 240 may be based on target service level, demand, cost, fill rate, or the like. According to embodiments, inventory policies 240 may be used by mixed-reality visualization system 110 to determine a no-stockout probability, fill rate, cost, or other like determination of KPI targets, as described below. According to embodiment, inventory policies 240 comprise target service levels that ensure that a service level of one or more supply chain entities 150 is met with a certain probability. For example, one or more supply chain entities 150 may set a target service level at 95%, meaning one or more supply chain entities 150 will set the desired inventory stock level at a level that meets demand 95% of the time. Although a particular target service level and percentage is described, embodiments contemplate any target service level, for example, a target service level of approximately 99% through 90%, 75%, or any target service level, according to particular needs. Other types of service levels associated with inventory quantity or order quantity may comprise, but are not limited to, a maximum expected backlog and a fulfillment level. Once the service level is set, one or more planning and execution systems of one or more supply chain entities 150 may determine a replenishment order according to one or more replenishment rules, which, among other things, indicates to one or more supply chain entities 150 to determine or receive inventory to replace the depleted inventory.

Supply chain data models 242 represent the flow of materials through one or more supply chain entities 150 of supply chain network 100. Mixed-reality user interface 202 may model the flow of materials through one or more supply chain entities 150 of supply chain network 100 as one or more supply chain data models 242 comprising network 170 of nodes and edges. The material storage and/or transition units may be modelled as nodes, which may be referred to as, for example, buffer nodes, buffers, or nodes. Each node may represent a buffer for an item (such as, for example, a raw material, intermediate good, finished good, component, and the like), resource, or operation (including, for example, a production operation, assembly operation, transportation operation, and the like). Various transportation or manufacturing processes are modelled as edges connecting the nodes. Each edge may represent the flow, transportation, or assembly of materials (such as items or resources) between the nodes by, for example, production processing or transportation. A planning horizon for supply chain data models 242 may be broken down into elementary time-units, such as, for example, time-buckets, or, simply, buckets. The edge between two buffer nodes may denote processing of material and the edge between different buckets for the same buffer may indicate inventory carried forward. Flow-balance constraints for most, if not every buffer in every bucket, model the material movement in supply chain network 100.

Cloud datastore 140 may comprise, in an embodiment, demographic and economic data 250. Demographic and economic data 250 may be maintained in cloud datastore 140 at one or more locations external to mixed-reality visualization system 110 or one or more rendering devices 120 and made available to one or more associated users of mixed-reality visualization system 110 and one or more rendering devices 120 using the cloud or in any other appropriate manner. Demographic and economic data 250 includes, for example, population data, population density, spending potential, per capita disposable income, and the like. Although cloud datastore 140 is shown as comprising demographic and economic data 250, embodiments contemplate any suitable number of this or other data, internal to, or externally coupled with, cloud datastore 140.

Figure 3:
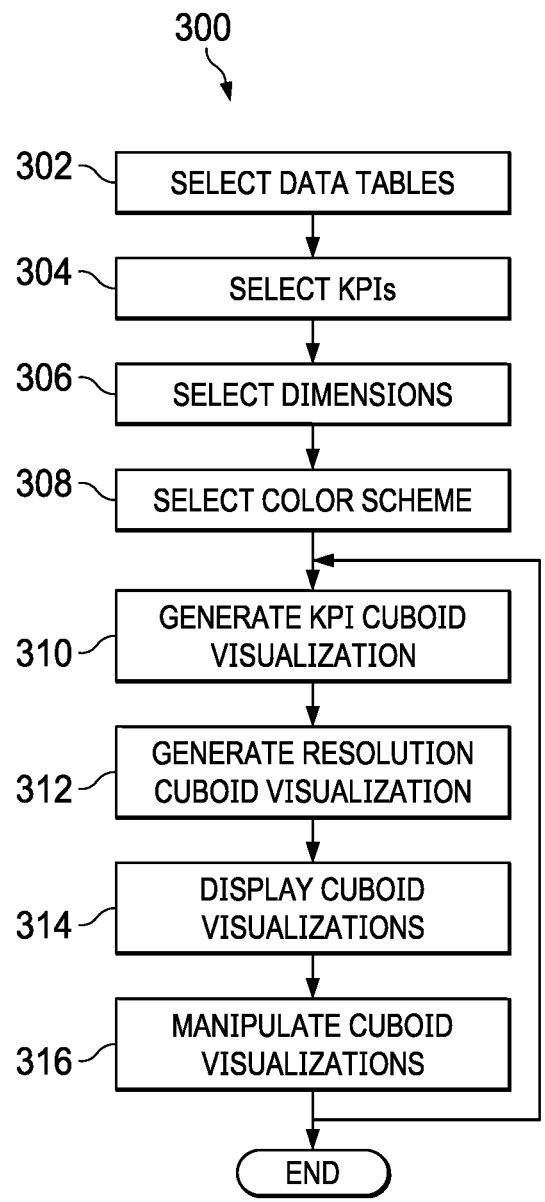
FIG. 3 illustrates an exemplary method of supply chain navigation and analysis using simultaneous mixed-reality KPI cuboid visualizations and mixed-reality resolution cuboid visualizations with spatial-aural feedback, in accordance with an embodiment.

FIG. 3 illustrates exemplary method 300 of supply chain navigation and analysis using simultaneous mixed-reality KPI cuboid visualizations and mixed-reality resolution cuboid visualizations with spatial-aural feedback, in accordance with an embodiment. Method 300 proceeds by one or more actions, which, although described in a particular order may be performed in one or more permutations, according to particular needs.

At action 302, data processing and transformation module 204 selects one or more data tables from which to render and visualize supply chain data 132 in simultaneous mixed-reality KPI cuboid visualizations and mixed-reality resolution cuboid visualizations (which, according to embodiments, may also comprise one or more mixed-reality analysis cuboid visualizations). Data processing and transformation module 204 may access and select data stored in mixed-reality visualization system 110 database 114 (including but not limited to supply chain static data 212, modified supply chain data 214, supply chain network models 210, data processing and transformation models 216, instructions data 218, KPI data 220, supply chain analytics 222, and supply chain alerts 224), supply chain database 130 (including but not limited to supply chain data 132 and/or supply chain models 238), and/or cloud datastore 140. In an embodiment, one or more rendering devices 120 transmits physical, visual, and/or voice input, such as from one or more users operating one or more rendering devices 120, to data processing and transformation module 204 to select one or more data tables. In other embodiments, data processing and transformation module 204 may select one or more data tables automatically, or may receive input from one or more computers 160 in supply chain network 100 to select one or more data tables. Data processing and transformation module 204 stores the selection of one or more data tables in supply chain network models 210 of mixed-reality visualization system 110 database 114.

At action 304, data processing and transformation module 204 selects one or more KPIs to render and visualize supply chain data 132 in simultaneous mixed-reality KPI cuboid visualizations and mixed-reality resolution cuboid visualizations. Data processing and transformation module 204 may access and select KPIs stored in mixed-reality visualization system 110 database 114 (including but not limited to KPI data 220), and/or data stored in supply chain database 130 and/or cloud datastore 140. In an embodiment, one or more rendering devices 120 transmits physical, visual, and/or voice input, such as from one or more users operating one or more rendering devices 120, to data processing and transformation module 204 to select one or more KPIs. In other embodiments, data processing and transformation module 204 may select one or more KPIs automatically, or may receive input from one or more computers 160 in supply chain network 100 to select one or more KPIs. Data processing and transformation module 204 stores the selection of one or more KPIs in supply chain network models 210.

At action 306, data processing and transformation module 204 selects the dimensions by which to render and visualize supply chain data 132 in the mixed-reality KPI cuboid visualization component of the simultaneous mixed-reality KPI cuboid visualizations and mixed-reality resolution cuboid visualizations. The mixed-reality KPI cuboid visualization may display supply chain data 132, such as, for example, product sales, facilities at which products are sold, and sale time periods, as separate dimensional axes, as best illustrated by FIG. 5. In an embodiment, one or more rendering devices 120 transmits physical, visual, and/or voice input, such as from one or more users operating one or more rendering devices 120, to data processing and transformation module 204 to select one or more dimensions. In other embodiments, data processing and transformation module 204 may select one or more dimensions automatically, or may receive input from one or more computers 160 in supply chain network 100 to select one or more dimensions. Data processing and transformation module 204 stores the selection of one or more dimensions in supply chain network models 210.

At action 308, data processing and transformation module 204 selects the display color scheme of the mixed-reality KPI cuboid visualization and/or the mixed-reality resolution cuboid visualization. The mixed-reality KPI cuboid visualization may use a variety of colors to display and represent supply chain data 132, such as, for example, gray to represent standard product sales and purple, green, or blue to represent abnormal product sales, shipment shortages, and/or other supply chain exceptions. In an embodiment, one or more rendering devices 120 transmits physical, visual, and/or voice input, such as from one or more users operating one or more rendering devices 120, to data processing and transformation module 204 to select a display color scheme. In other embodiments, data processing and transformation module 204 may select one or more display color schemes automatically, or may receive input from one or more computers 160 in supply chain network 100 to select one or more dimensions. Data processing and transformation module 204 stores the selection of one or more display color schemes in supply chain network models 210.

At action 310, mixed-reality user interface 202 generates a mixed-reality KPI cuboid visualization. Mixed-reality user interface 202 accesses the selection of one or more data tables, KPIs, dimensions, and color schemes stored in supply chain network models 210. Mixed-reality user interface 202 accesses data stored in mixed-reality visualization system 110 database 114, supply chain database 130, and/or cloud datastore 140 that corresponds to the selected one or more data tables. Mixed-reality user interface 202 generates a mixed-reality KPI cuboid visualization displaying the selected data tables according to the selected KPIs, dimensions, and color schemes. Mixed-reality user interface 202 stores the generated mixed-reality KPI cuboid visualization in mixed-reality visualization data 230 of mixed-reality visualization system 110 database 114.

At action 312, mixed-reality user interface 202 generates a mixed-reality resolution cuboid visualization. According to embodiments, exception solver 206 evaluates one or more supply chain models 238, supply chain network models 210, supply chain planning problems, supply chain planning data 230, and/or one or more mixed-reality KPI cuboid visualizations generated by mixed-reality user interface 202 to detect supply chain exceptions according to one or more exceptions criteria 228. Having located one or more supply chain exceptions, exception solver 206 may store the supply chain exceptions in exceptions data 226. Exception solver 206 ranks the supply chain exceptions by severity of exception as measured by exceptions criteria 228, assigns severity rankings to the exceptions stored in exceptions data 226, generates one or more resolution options to address the exceptions, and stores the resolution options in exceptions data 226.

Mixed-reality user interface 202 accesses the ranked exceptions and resolution options stored in the exception data and generates a mixed-reality resolution cuboid visualization, and/or a mixed-reality analysis cuboid visualization, displaying one or more exceptions and/or resolution options in the form of a rotatable three-dimensional cubical model comprised of smaller exception and non-exception cubelets. Mixed-reality user interface 202 stores the generated mixed-reality resolution cuboid visualization, and/or the generated mixed-reality analysis cuboid visualization, in mixed-reality visualization data 230 of mixed-reality visualization system 110 database 114. According to embodiments, mixed-reality visualization system 110 may generate one or more mixed-reality analysis cuboid visualizations, illustrated by FIG. 7, as particular configurations of one or more mixed-reality resolution cuboid visualizations.

At action 314, mixed-reality visualization system 110 and rendering device 120 display the generated mixed-reality KPI cuboid visualization and mixed-reality resolution cuboid visualization. Data processing and transformation module 204 accesses the mixed-reality KPI cuboid visualization and the mixed-reality resolution cuboid visualization stored in mixed-reality visualization data 230. Data processing and transformation module 204 transmits the mixed-reality KPI cuboid visualization and the resolution cuboid visualization to memory 126 of rendering device 120. Rendering device 120 accesses the mixed-reality KPI cuboid visualization and the resolution cuboid visualization stored in memory 126 and displays the mixed-reality KPI cuboid visualization and the resolution cuboid visualization on rendering device 120 display.

At an action 316, mixed-reality visualization system 110 manipulates the mixed-reality KPI cuboid visualization and the mixed-reality resolution cuboid visualization in response to input received by rendering device 120. Rendering device 120 sensors 122 detect physical, visual, and/or voice input, such as from a user operating rendering device 120. Rendering device 120 processors 124 transmit the physical, visual, and/or voice input to mixed-reality user interface 202 of mixed-reality visualization system 110 server 112. In response to the physical, visual, and/or voice input, mixed-reality user interface 202 manipulates the mixed-reality KPI cuboid visualization and/or the mixed-reality resolution cuboid visualization. According to embodiments, manipulations to the mixed-reality KPI cuboid visualization and/or the mixed-reality resolution cuboid visualization may include, for example, rotating one or more mixed-reality cuboids in virtual mixed-reality space, compressing one or more mixed-reality cuboids, expanding one or more mixed-reality cuboids, slicing one or more mixed-reality cuboids into slices or stacks of smaller cubelets to display different aspects of supply chain data 132, and/or manipulating intersections between slices and/or stacks.

In response to such manipulations, mixed-reality visualization system 110 may generate and display revised mixed-reality KPI cuboid visualizations. According to embodiments, and as described in greater detail below, rendering device 120 and/or one or more computers 160 may, in response to user input, alter one or more variables or data displayed by the mixed-reality KPI cuboid visualization and/or the mixed-reality resolution cuboid visualization. Mixed-reality visualization system 110 may store the altered one or more variables or data in modified supply chain data 214 of mixed-reality visualization system 110 database 114, and may return to action 310 to generate one or more revised mixed-reality KPI cuboid visualizations and/or action 312 to generate one or more revised mixed-reality resolution cuboid visualizations displaying the altered one or more variables or data. Mixed-reality visualization system 110 may then continue the actions of method 300, continuously updating both the mixed-reality KPI cuboid visualization and the mixed-reality resolution cuboid visualization in response to input detected by rendering device 120 sensors 122, and may, for example, implement changes made to the mixed-reality KPI cuboid visualization on the mixed-reality resolution cuboid visualization, and vice versa.

In an embodiment, in response to manipulations that alter one or more supply chain inputs (such as, for example, available raw materials, minimum shipment times between supply chain nodes, manufacturing minimum quotas, and the like), mixed-reality visualization system 110 may automatically re-calculate one or more exceptions that may have been created by the altered supply chain inputs. Mixed-reality visualization system 110 may continuously update the exceptions and resolution options displayed by the mixed-reality KPI cuboid visualizations and/or the mixed-reality resolution cuboid visualizations to display current exceptions and resolution options. Rendering device 120 may respond to input to one or more sensors 122 (such as, for example, voice commands to a microphone or gestures made to hand-tracking sensors 122) to select one or more resolution options. Mixed-reality visualization system 110 may then implement one or more resolution options, and may terminate method 300 if rendering device 120 receives no further input.

The following example illustrates the operation of mixed-reality visualization system 110 generating and manipulating simultaneous mixed-reality KPI cuboid visualizations and mixed-reality resolution cuboid visualizations (including, in this example, mixed-reality analysis cuboid visualizations). In this example, mixed-reality visualization system 110 executes the actions of the above-described method 300 to (1) select parameters from which to generate a mixed-reality KPI cuboid visualization and a mixed-reality resolution cuboid visualization, (2) generate a mixed-reality KPI cuboid visualization and a mixed-reality resolution cuboid visualization, (3) display the mixed-reality KPI cuboid visualization and the mixed-reality resolution cuboid visualization simultaneously, and (4) manipulate the mixed-reality KPI cuboid visualization and the mixed-reality resolution cuboid visualization to address supply chain exceptions, generate and display mixed-reality analysis cuboid visualizations, and display and select resolution options in response to input received by rendering device 120 sensors 122. Although particular examples of mixed-reality visualization system 110 actions are illustrated and described herein, embodiments contemplate mixed-reality visualization system 110 generating and manipulating mixed-reality KPI cuboid visualizations and mixed-reality resolution cuboid visualizations in any configuration, according to particular needs.

In this example, at action 302, data processing and transformation module 204 selects a "Product/Facility/Time Period" data table, stored in historical retail data 234 of supply chain database 130, from which to render and visualize supply chain data 132 in a simultaneous mixed-reality KPI cuboid visualization and mixed-reality resolution cuboid visualization. In this example, the "Product/Facility/Time Period" data table stores sales data relating to the sales of several products at multiple separate facilities over three separate time periods. In other embodiments, data processing and transformation module 204 may select and access any data tables stored at any location in supply chain network 100. In this example, rendering device 120 transmits voice input, in the form of a user stating "Access the 'Product/Facility/Time Period' data table," to data processing and transformation module 204 to select a data table at action 302. Data processing and transformation module 204 stores the selection of the "Product/Facility/Time Period" data table in supply chain network models 210 of mixed-reality visualization system 110 database 114. In other embodiments, one or more rendering devices 120 may transmit physical, visual, and/or voice input, to data processing and transformation module 204 to select one or more data tables, data processing and transformation module 204 may select one or more data tables automatically, or data processing and transformation module 204 may receive input from one or more computers 160 in supply chain network 100 to select one or more data tables.

Continuing the example, and at action 304, data processing and transformation module 204 selects, as the relevant KPI to display on the mixed-reality KPI cuboid visualization, "product sales at various facilities over time." As illustrated by FIG. 5, the selection of the "product sales at various facilities over time" KPI enables mixed-reality visualization system 110 to display virtual cuboids comprised of individual product-facility-time period sales data cubelets. Data processing and transformation module 204 stores the selection of the "product sales at various facilities over time" KPI in supply chain network models 210.

Continuing the example, and at action 306, data processing and transformation module 204 selects three dimensions ("products," "facilities," and "time periods") by which to render and visualize the "Product/Facility/Time Period" data table in a mixed-reality KPI cuboid visualization. Data processing and transformation module 204 stores the selection of the "products," "facilities," and "time periods" dimensions in supply chain network models 210. At action 308, data processing and transformation module 204 selects a grayscale color scheme, in which shades of lighter grays indicate individual cubelets and darker grays indicates a particular cubelet currently selected by mixed-reality user interface 202, and stores the grayscale color scheme in supply chain network models 210. In other embodiments not illustrated by this example, data processing and transformation module 204 may select, for example, a gray and blue color scheme, a purple, blue, and green color scheme, and/or any other color scheme.

Continuing the example, and at action 310, mixed-reality user interface 202 generates a "Product/Facility/Time Period" mixed-reality KPI cuboid visualization. Mixed-reality user interface 202 accesses the selection of the "Product/Facility/Time Period" data table, the "product sales at various facilities over time" KPI, the "products," "facilities," and "time periods" dimensions, and the grayscale color scheme, stored in supply chain network models 210. Mixed-reality user interface 202 generates a "Product/Facility/Time Period" mixed-reality KPI cuboid visualization displaying the selected data tables according to the selected KPIs, dimensions, and color schemes. Mixed-reality user interface 202 stores the generated "Product/Facility/Time Period" mixed-reality KPI cuboid visualization in mixed-reality visualization data 230 of mixed-reality visualization system 110 database 114.

Continuing the example, and at action 312, mixed-reality user interface 202 generates a mixed-reality resolution cuboid visualization depicting exceptions for the "Product/Facility/Time Period" data table. Exception solver 206 accesses exceptions criteria 228 and evaluates the "Product/Facility/Time Period" data table and the mixed-reality KPI cuboid visualization generated by mixed-reality user interface 202 to detect supply chain exceptions according to exceptions criteria 228. In this example, and as best illustrated by FIG. 6, exception solver 206 locates eight minor exceptions (wherein a "Product/Facility/Time Period" intersection cubelet failed to meet anticipated sales by less than 10%), and three major exceptions (wherein a "Product/Facility/Time Period" intersection cubelet failed to meet anticipated sales by greater than 10%), in the current "Product/Facility/Time Period" data table according to exceptions criteria 228. Exception solver 206 ranks the eight minor and three major exceptions according to exceptions criteria 228, and stores the exceptions in exceptions data 226. Exception solver 206 generates one or more resolution options, best illustrated by FIG. 7, to address the exceptions, and stores the resolution options in exceptions data 226. Mixed-reality user interface 202 accesses the ranked exceptions stored in the exception data and generates a mixed-reality resolution cuboid visualization displaying one or more exceptions in the form of a rotatable three-dimensional cubical model comprised of smaller exception and non-exception cubelets. In this example, and as best illustrated in FIG. 6, mixed-reality user interface 202 illustrates each of the eight minor exceptions with a small gray dot, and each of the three major exceptions with a fully-shaded "Product/Facility/Time Period" intersection cubelet (with a dark gray color indicating the most severe major exception, a medium gray color indicating the second-most-severe major exception, and a light gray color indicating the least severe major exception). Mixed-reality user interface 202 stores the generated mixed-reality resolution cuboid visualization in mixed-reality visualization data 230 of mixed-reality visualization system 110 database 114.

Continuing the example, and at action 314, mixed-reality visualization system 110 and rendering device 120 simultaneously display the generated "Product/Facility/Time Period" mixed-reality KPI cuboid visualization and the mixed-reality resolution cuboid visualization. Data processing and transformation module 204 accesses the "Product/Facility/Time Period" mixed-reality KPI cuboid visualization and the mixed-reality resolution cuboid visualization stored in mixed-reality visualization data 230. Data processing and transformation module 204 transmits the "Product/Facility/Time Period" mixed-reality KPI cuboid visualization and the mixed-reality resolution cuboid visualization to memory 126 of rendering device 120. Rendering device 120 accesses the "Product/Facility/Time Period" mixed-reality KPI cuboid visualization and the mixed-reality resolution cuboid visualization stored in memory 126 and simultaneously displays the mixed-reality KPI cuboid visualization and the mixed-reality resolution cuboid visualization on rendering device 120 display.

Figure 4:
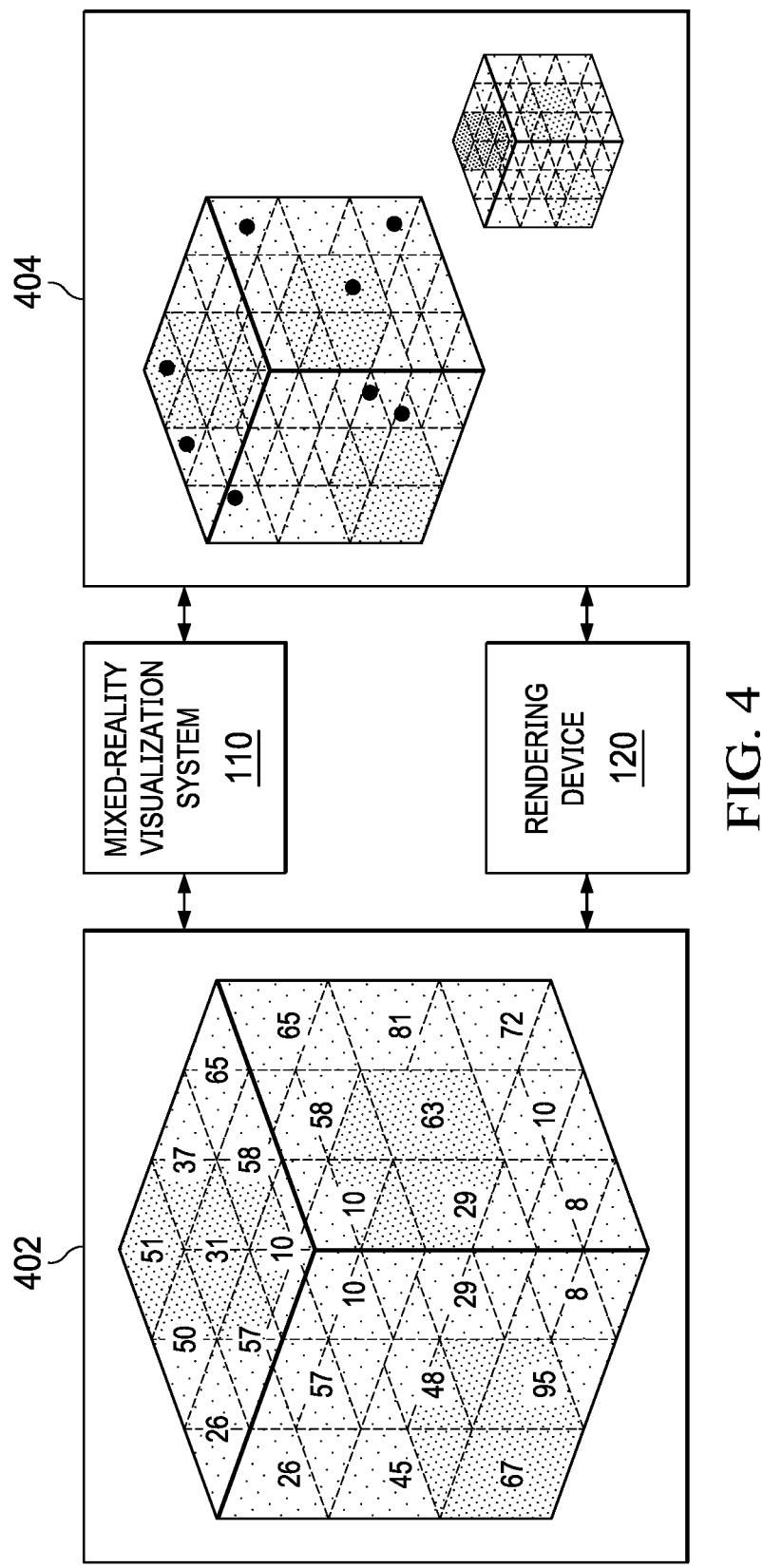
FIG. 4 illustrates the mixed-reality visualization system simultaneously generating a mixed-reality KPI cuboid visualization display and a mixed-reality resolution cuboid visualization display, according to an embodiment.

FIG. 4 illustrates mixed-reality visualization system 110 simultaneously generating mixed-reality KPI cuboid visualization display 402 and mixed-reality resolution cuboid visualization display 404, according to an embodiment. As illustrated by FIG. 4, and in this example, mixed-reality visualization system 110 may generate, and display on rendering device 120 display 128, "Product/Facility/Time Period" mixed-reality KPI cuboid visualization display 402 and mixed-reality resolution cuboid visualization display 404. Although particular examples of mixed-reality visualization system 110 outputs are illustrated and described herein, embodiments contemplate mixed-reality visualization system 110 generating mixed-reality KPI cuboid visualizations and mixed-reality resolution cuboid visualizations in any configuration, according to particular needs.

Continuing the example, mixed-reality user interface 202 simultaneously generates "Product/Facility/Time Period" mixed-reality KPI cuboid visualization display 402 and mixed-reality resolution cuboid visualization display 404. In this embodiment, one or more rendering device 120 sensors 122 respond to one or more user inputs (including but not limited to physical inputs, voice inputs, and visual inputs) to navigate between simultaneous mixed-reality renderings of "Product/Facility/Time Period" mixed reality KPI cuboid visualization display 402 and mixed-reality resolution cuboid visualization display 404. As an example only and not by way of limitation, rendering device 120 sensors 122 may respond to one or more physical inputs, such as, for example, turning and panning rendering device 120 in three-dimensional space, to expand, contract, or otherwise alter the mixed-reality view of "Product/Facility/Time Period" mixed reality KPI cuboid visualization 402, mixed-reality resolution cuboid visualization display 404, or both mixed reality KPI cuboid visualization 402 and mixed-reality resolution cuboid visualization display 404 simultaneously. In this manner, the user of one or more rendering devices 120 may focus rendering device 120 display on "Product/Facility/Time Period" mixed-reality KPI cuboid visualization display 402 (best illustrated by FIG. 5), mixed-reality resolution cuboid visualization display 404 (best illustrated by FIG. 6), or a combination of both "Product/Facility/Time Period" mixed-reality KPI cuboid visualization display 402 and mixed-reality resolution cuboid visualization display 404 displayed together.

FIG. 5 illustrates mixed-reality KPI cuboid visualization display 402 of FIG. 4 in greater detail, according to an embodiment. In an embodiment, mixed-reality KPI cuboid visualization display 402 may comprise three-dimensional cuboid 504 comprised of a plurality of individual cubelets 506, display dimensions 508, cubelet data table 510, and explanatory text 512. Although FIG. 5 illustrates exemplary mixed-reality KPI cuboid visualization display 402 as comprising three-dimensional cuboid 504 comprised of a plurality of cubelets 506, display dimensions 508, cubelet data table 510, and explanatory text 512 in a particular configuration, embodiments contemplate mixed-reality visualization system 110, mixed-reality user interface 202, and one or more rendering devices 120 generating mixed-reality KPI cuboid visualization displays 402 of any configuration and displaying any data stored in database 114, supply chain data 132, and/or cloud datastore 140 in any visual format, according to particular needs.

Continuing the example, in the embodiment illustrated by FIG. 5, mixed-reality KPI cuboid visualization display 402 comprises three-dimensional cuboid 504 comprised of twenty-seven (27) individual cubelets 506, each of which represents an individual product-facility-time period sales intersection, corresponding to one cell on cubelet data table 510. Mixed-reality KPI cuboid visualization display 402 displays data contained in the "Product/Facility/Time Period" data table (displayed by cubelet data table 510) according to the "product sales at various facilities over time" KPI and the three selected dimensions: "products," "facilities," and "time periods" (indicated by display dimensions 508). In the embodiment illustrated by FIG. 5, mixed-reality KPI cuboid visualization display 402 displays the sales of three separate products (in this example, m1, m2, and m3) sold at three separate facilities (in this example, f1, f2, and f3) across three separate time periods (in this example, n1, n2, and n3), comprising 27 individual product-facility-time period sales intersections. In this example, mixed-reality user interface 202 displays each of the 27 individual product-facility-time period sales intersections as an individual cubelet 506, arranged to comprise three-dimensional cuboid 504 according to the "products," "facilities," and "time periods" dimensions. According to embodiments, explanatory text 512 may display one or more text messages, generated by mixed-reality user interface 202, to provide additional information explaining the arrangement and details of mixed-reality KPI cuboid visualization display 402. Although FIG. 5 illustrates mixed-reality KPI cuboid visualization display 402 in a particular configuration, embodiments contemplate mixed-reality visualization system 110 organizing and displaying cubelets in any cuboid configuration, according to particular needs.

According to embodiments, mixed-reality visualization system 110 may generate cuboids 504 comprising one or more "slices," which illustrate, for example, product-facility-time period sales intersection cubelets 506 for multiple products (m1, m2, and m3) sold at a single facility (such as, for example, f1) over multiple time periods (n1, n2, and n3); or one or more "stacks," which illustrate, for example, product-facility-time period sales intersection cubelets 506 for a single product (such as, for example, m2) sold at a single facility (such as, for example, f1) over multiple time periods (n1, n2, and n3).

FIG. 6 illustrates mixed-reality resolution cuboid visualization display 404 of FIG. 4 in greater detail, according to an embodiment. Mixed-reality resolution cuboid visualization display 404 may comprise, in an embodiment, three-dimensional cuboid 604a (comprised of non-exception cubelets 606a and shaded exception cubelets 606c), three-dimensional cuboid 604b (comprised of non-exception cubelets 606b and shaded exception cubelets 606d), display dimensions 608, explanatory texts 612a and 612b, minor exceptions 614a, and major exceptions 614b-614d. Although FIG. 6 illustrates mixed-reality resolution cuboid visualization display 404 as comprising three-dimensional cuboids 604a and 604b, cubelets 606a-606d, display dimensions 608, explanatory texts 612a and 612b, minor exceptions 614a, and major exceptions 614b-614d, embodiments contemplate mixed-reality visualization system 110, mixed-reality user interface 202, and one or more rendering devices 120 generating mixed-reality resolution cuboid visualization displays 404 of any configuration and displaying any data stored in database 114 (including one or more resolution options generated by exception solver 206 and stored in exceptions data 226), supply chain data 132, and/or cloud datastore 140 in any visual format, according to particular needs.

Continuing the example, mixed-reality resolution cuboid visualization display 404 may display one or more transparent non-exception cubelets 606a and 606b and one or more shaded exception cubelets 606c and 606d, best illustrated in FIG. 6 by cubelets 606c and 606d containing exceptions 614a and 614d. In this example, mixed-reality user interface 202 illustrates, on three-dimensional cuboid 604a, eight minor exceptions 614a indicated with small gray dots. In this example, mixed-reality user interface 202 illustrates, on three-dimensional cuboid 604b, three major exceptions 614b-614d by fully shading the "Product/Facility/Time Period" intersection cubelet 606d associated with each major exception 614b-614d in a specific color (with a dark gray color indicating the most severe major exception 614b, a medium gray color indicating the second-most-severe major exception 614c, and a light gray color indicating the least severe major exception 614d). According to embodiments, explanatory text 612a and 612b may display one or more text messages, generated by mixed-reality user interface 202, to provide additional information explaining the arrangement and details of mixed-reality resolution cuboid visualization display 404.

In an embodiment, mixed-reality visualization system 110 may display minor exceptions 614a and/or major exceptions 614b-614d graded in any number of degrees of severity or displayed using any color. Mixed-reality visualization system 110 may display mixed-reality resolution cuboid visualization displays 404 in varying degrees of transparency, permitting the visualization of one or more shaded minor exceptions 614a and/or major exceptions 614b-614d through one or more intervening layers of transparent three-dimensional cuboids 604a and/or 604b. By controlling the degrees of transparency of three-dimensional cuboids 604a and/or 604b, and by continuing to emphasize one or more shaded minor exceptions 614a and/or major exceptions 614b-614d, mixed-reality visualization system 110 may enable a user to keep one or more minor exceptions 614a and/or major exceptions 614b-614d displayed and visible on mixed-reality resolution cuboid visualization display 404 as the user works through large bodies of data represented by mixed-reality KPI cuboid visualization displays 402.

Continuing the example, and at action 316, mixed-reality visualization system 110 manipulates mixed-reality KPI cuboid visualization display 402 and mixed-reality resolution cuboid visualization display 404 in response to input received by rendering device 120. In this example, rendering device 120 sensors 122 detect physical inputs from a user operating rendering device 120. Rendering device 120 processors 124 transmit the physical input to mixed-reality user interface 202 of mixed-reality visualization system 110 server 112. In response to the physical input, mixed-reality user interface 202 manipulates mixed-reality KPI cuboid visualization display 402 and mixed-reality resolution cuboid visualization display 404, and alters variables and data displayed by mixed-reality KPI cuboid visualization display 402 and mixed-reality resolution cuboid visualization display 404. In this embodiment, mixed-reality visualization system 110 alters mixed-reality KPI cuboid visualization display 402 in response to input received to mixed-reality resolution cuboid visualization display 404, and alters mixed-reality resolution cuboid visualization display 404 in response to input received to mixed-reality KPI cuboid visualization display 402. In this example, Mixed-reality visualization system 110 stores the altered one or more variables or data in modified supply chain data 214 of mixed-reality visualization system 110 database 114, accesses resolution options generated by exception solver 206 and stored in exceptions data 226, and generates mixed-reality analysis cuboid visualization display 702, best illustrated by FIG. 7, displaying the altered one or more variables or data and the resolution options.

FIG. 7 illustrates mixed-reality analysis cuboid visualization display 702, according to an embodiment. According to embodiments, mixed-reality visualization system 110 may generate one or more mixed-reality analysis cuboid visualization displays 702 as particular configurations of one or more mixed-reality resolution cuboid visualization displays 404. Continuing the example, mixed-reality analysis cuboid visualization display 702 displays, in this embodiment, three-dimensional cuboid 704a (comprised of cubelets 706a), three-dimensional cuboid 704b (comprised of cubelets 706b), display dimensions 708a and 708b, explanatory texts 712a and 712b, exceptions 714a-714c, and resolution options 716. Although FIG. 7 illustrates mixed-reality analysis cuboid visualization display 702 as comprising three-dimensional cuboid 704a (comprised of cubelets 706a), three-dimensional cuboid 704b (comprised of cubelets 706b), display dimensions 708a and 708b, explanatory texts 712a and 712b, exceptions 714a-714c, and resolution options 716, embodiments contemplate mixed-reality visualization system 110, mixed-reality user interface 202, and one or more rendering devices 120 generating mixed-reality analysis cuboid visualization displays 702 of any configuration and displaying any data stored in database 114, supply chain data 132, and/or cloud datastore 140 in any visual format, according to particular needs.

In the embodiment illustrated by FIG. 7, mixed-reality user interface 202 accesses exceptions data 226, and displays resolution options 716 to resolve the "Product/Facility/Time Period" sales shortfall exceptions. According to embodiments, resolutions options 716 may include product promotions (with may comprise, for example, issuing sales coupons valid for particular products or at particular sales facilities to stimulate sales), product price reductions (which may comprise, for example, permanently reducing the price of one or more items to stimulate sales), or product stocking reallocations (which may comprise, for example, stocking different products at particular sales facilities to increase sales). Other embodiments contemplate mixed-reality visualization system 110 generating resolution options 716 of any configuration, according to particular needs. According to embodiments, explanatory text 712a and 712b may display one or more text messages, generated by mixed-reality user interface 202, to provide additional information explaining the arrangement and details of mixed-reality analysis cuboid visualization display 702.

In an embodiment, a user operating rendering device 120 may select one or more resolution options 716. Mixed-reality visualization system 110 may then generate one or more revised mixed-reality KPI cuboid visualization displays 402, one or more revised mixed-reality resolution cuboid visualization displays 404, and/or one or more revised mixed-reality analysis cuboid visualization displays 702 to display the anticipated effects of implementing one or more resolution options on supply chain network 100. Concluding with this example, mixed-reality visualization system 110 then terminates method 300.

In an embodiment, mixed-reality visualization system 110 permits one or more users of one or more rendering devices 120 to conduct supply chain network 100 analyses that leverage the strengths of mixed-reality KPI cuboid visualization displays 402 along with the strengths of mixed-reality resolution cuboid visualization displays 404 and/or mixed-reality analysis cuboid visualization displays 702. For example, according to embodiments, some analyses, such as slicing or stacking cuboids and cubelets, may be best accomplished using mixed-reality KPI cuboid visualization display 402. Other analyses, such as continuing to display one or more shaded exceptions as the user rotates or zooms a mixed-reality cuboid comprised of transparent cubelets, may be best accomplished using mixed-reality resolution cuboid visualization display 404 and/or mixed-reality analysis cuboid visualization display 702. Mixed-reality visualization system 110 may continuously update both mixed-reality KPI cuboid visualization display 402, mixed-reality resolution cuboid visualization display 404, and/or mixed-reality analysis cuboid visualization display 702 in response to input detected by rendering device 120 sensors 122, and may, for example, implement changes made to mixed-reality KPI cuboid visualization display 402 on mixed-reality resolution cuboid visualization display 404 or mixed-reality analysis cuboid visualization display 702, and vice versa.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A computer-implemented method, comprising:
generating, by a computer comprising a processor and memory, a first mixed-reality object comprising a first cuboid, the first cuboid comprising one or more adjustable display dimensions and one or more cubelets divided along at least one of the one or more adjustable display dimensions;
displaying, by a mixed-reality display device comprising a display and one or more sensors, the first mixed-reality object;
transforming, by the computer, one or more cubelets of the first cuboid in response to a first input received by the one or more sensors of the mixed-reality display device;

identifying, by the computer and in response to transforming one or more cubelets of the first cuboid, one or more exceptions;

generating, by the computer and for at least one of the one or more exceptions, one or more resolution options to resolve, at least in part, the at least one of the one or more exceptions; and displaying, by the display of the mixed-reality display device, the transformed one or more cubelets of the first cuboid and the one or more resolution options.

2. The computer-implemented method of claim 1, further comprising:

generating, by the computer, a second mixed-reality object comprising a second cuboid, the second cuboid comprising one or more adjustable display dimensions corresponding to one or more key process indicators (KPIs) and one or more KPI cubelets divided along at least one of the one or more adjustable display dimensions;

adjusting, by the computer and in response to a second input received by the one or more mixed-reality display device sensors, one or more of the adjustable display dimensions of the first cuboid of the first mixed-reality object;

transforming, by the computer and in response to adjustments made to one or more of the adjustable display dimensions of the first cuboid of the mixed-reality object, one or more KPI cubelets of the second cuboid; and displaying, by the display of the mixed-reality display device, the transformed one or more KPI cubelets of the second cuboid and the transformed one or more cubelets of the first cuboid.

3. The computer-implemented method of claim 1, further comprising:

calculating, by the computer and in response to the first input received by the one or more sensors of the mixed-reality display device, new data values for the one or more cubelets of the first mixed-reality object.

4. The computer-implemented method of claim 1, further comprising:

calculating, by the computer and in response to the first input received by the one or more sensors of the mixed-reality display device, new data values for the one or more cubelets of the first mixed-reality object, the calculating new data values for one or more cubelets comprising one or more of:

aggregating cubelet data by summation;

removing cubelet data by subtraction;

calculating the mean value of one or more groups of cubelets;

calculating the median value of one or more groups of cubelets;

calculating the mode value of one or more groups of cubelets; and displaying the highest single cubelet value within one or more groups of cubelets.

5. The computer-implemented method of claim 1, further comprising:

transmitting, by the computer and in response to transforming the one or more cubelets of the first cuboid, instructions to alter actions at one or more supply chain entities.

6. The computer-implemented method of claim 1, further comprising:

transmitting, by the computer and in response to transforming the one or more cubelets of the first cuboid, instructions to alter actions at one or more supply chain entities, the instructions comprising one or more of:

an instruction to increase capacity at one or more supply chain entity locations;

an instruction to alter product demand or supply levels at the one or more supply chain entities;

an instruction to choose the location for a distribution center in a particular geographic region;

an instruction to adjust product mix ratios at the one or more supply chain entities; and an instruction to alter the configuration of packaging of one or more products sold by the one or more supply chain entities.

7. The computer-implemented method of claim 1, wherein the input received by the one or more sensors comprises one or more of:

a voice command;

a hand gesture; and an eye movement.

8. A system, comprising a computer comprising a processor and memory and a mixed-reality display device comprising a display and one or more sensors, the system configured to:

generate, by the computer, a first mixed-reality object comprising a first cuboid, the first cuboid comprising one or more adjustable display dimensions and one or more cubelets divided along at least one of the one or more adjustable display dimensions;

display, by the mixed-reality display device, the first mixed-reality object;

transform, by the computer, one or more cubelets of the first cuboid in response to a first input received by the one or more sensors of the mixed-reality display device;

identify, by the computer and in response to transforming one or more cubelets of the first cuboid, one or more exceptions;

generate, by the computer and for at least one of the one or more exceptions, one or more resolution options to resolve, at least in part, the at least one of the one or more exceptions; and display, by the display of the mixed-reality display device, the transformed one or more cubelets of the first cuboid and the one or more resolution options.

9. The system of claim 8, further comprising:

generating, by the computer, a second mixed-reality object comprising a second cuboid, the second cuboid comprising one or more adjustable display dimensions corresponding to one or more key process indicators (KPIs) and one or more KPI cubelets divided along at least one of the one or more adjustable display dimensions;

adjusting, by the computer and in response to a second input received by the one or more mixed-reality display device sensors, one or more of the adjustable display dimensions of the first cuboid of the first mixed-reality object;

transforming, by the computer and in response to adjustments made to one or more of the adjustable display dimensions of the first cuboid of the mixed-reality object, one or more KPI cubelets of the second cuboid; and displaying, by the display of the mixed-reality display device, the transformed one or more KPI cubelets of the second cuboid and the transformed one or more cubelets of the first cuboid.

10. The system of claim 8, further comprising:
calculating, by the computer and in response to the first input received by the one or more sensors of the mixed-reality display device, new data values for the one or more cubelets of the first mixed-reality object.

11. The system of claim 8, further comprising:
calculating, by the computer and in response to the first input received by the one or more sensors of the mixed-reality display device, new data values for the one or more cubelets of the first mixed-reality object, the calculating new data values for one or more cubelets comprising one or more of:
aggregating cubelet data by summation;
removing cubelet data by subtraction;
calculating the mean value of one or more groups of cubelets;
calculating the median value of one or more groups of cubelets;
calculating the mode value of one or more groups of cubelets; and
displaying the highest single cubelet value within one or more groups of cubelets.

12. The system of claim 8, further comprising:
transmitting, by the computer and in response to transforming the one or more cubelets of the first cuboid, instructions to alter actions at one or more supply chain entities.

13. The system of claim 8, further comprising:
transmitting, by the computer and in response to transforming the one or more cubelets of the first cuboid, instructions to alter actions at one or more supply chain entities, the instructions comprising one or more of:
an instruction to increase capacity at one or more supply chain entity locations;
an instruction to alter product demand or supply levels at the one or more supply chain entities;
an instruction to choose the location for a distribution center in a particular geographic region;
an instruction to adjust product mix ratios at the one or more supply chain entities; and
an instruction to alter the configuration of packaging of one or more products sold by the one or more supply chain entities.

14. The system of claim 8, wherein the input received by the one or more sensors comprises one or more of:
a voice command;
a hand gesture; and
an eye movement.

15. A non-transitory computer-readable storage medium embodied with software, the software when executed configured to:
generate a first mixed-reality object comprising a first cuboid, the first cuboid comprising one or more adjustable display dimensions and one or more cubelets divided along at least one of the one or more adjustable display dimensions;
display, by a mixed-reality display device comprising a display and one or more sensors, the first mixed-reality object;
transform one or more cubelets of the first cuboid in response to a first input received by the one or more sensors of the mixed-reality display device;
identify, in response to transforming one or more cubelets of the first cuboid, one or more exceptions;
generate, for at least one of the one or more exceptions, one or more resolution options to resolve, at least in part, the at least one of the one or more exceptions; and
display, by the display of the mixed-reality display device, the transformed one or more cubelets of the first cuboid and the one or more resolution options.

16. The non-transitory computer-readable storage medium of claim 15, wherein the software when executed is further configured to:
generate a second mixed-reality object comprising a second cuboid, the second cuboid comprising one or more adjustable display dimensions corresponding to one or more key process indicators (KPIs) and one or more KPI cubelets divided along at least one of the one or more adjustable display dimensions;
adjust, in response to a second input received by the one or more mixed-reality display device sensors, one or more of the adjustable display dimensions of the first cuboid of the first mixed-reality object;
transform, in response to adjustments made to one or more of the adjustable display dimensions of the first cuboid of the mixed-reality object, one or more KPI cubelets of the second cuboid; and
display, by the display of the mixed-reality display device, the transformed one or more KPI cubelets of the second cuboid and the transformed one or more cubelets of the first cuboid.

17. The non-transitory computer-readable storage medium of claim 15, wherein the software when executed is further configured to:
calculate, in response to the first input received by the one or more sensors of the mixed-reality display device, new data values for the one or more cubelets of the first mixed-reality object.

18. The non-transitory computer-readable storage medium of claim 15, wherein the software when executed is further configured to:
calculate, in response to the first input received by the one or more sensors of the mixed-reality display device, new data values for the one or more cubelets of the first mixed-reality object, the calculating new data values for one or more cubelets comprising one or more of:
aggregating cubelet data by summation;
removing cubelet data by subtraction;
calculating the mean value of one or more groups of cubelets;
calculating the median value of one or more groups of cubelets;
calculating the mode value of one or more groups of cubelets; and
displaying the highest single cubelet value within one or more groups of cubelets.

19. The non-transitory computer-readable storage medium of claim 15, wherein the software when executed is further configured to:
transmit, in response to transforming the one or more cubelets of the first cuboid, instructions to alter actions at one or more supply chain entities.

20. The non-transitory computer-readable storage medium of claim 15, wherein the software when executed is further configured to:
transmit, in response to transforming the one or more cubelets of the first cuboid, instructions to alter actions at one or more supply chain entities, the instructions comprising one or more of:
an instruction to increase capacity at one or more supply chain entity locations;
an instruction to alter product demand or supply levels at the one or more supply chain entities;

an instruction to choose the location for a distribution center in a particular geographic region;
an instruction to adjust product mix ratios at the one or more supply chain entities; and
an instruction to alter the configuration of packaging of one or more products sold by the one or more supply chain entities.

\* \* \* \* \*